US011790773B2

(12) United States Patent
Brooks et al.

(10) Patent No.: US 11,790,773 B2
(45) Date of Patent: Oct. 17, 2023

(54) VEHICLE PARKING DATA COLLECTION SYSTEM AND METHOD

(71) Applicant: QUANTIFLY LLC, Syracuse, NY (US)

(72) Inventors: Daniel Brooks, Huntington Woods, MI (US); Zachary Holbert, Brooklyn, NY (US); Adrianna Jordan, Plymouth, MI (US); Zimeng Lyu, Syracuse, NY (US); Javad Roostaei, North Syracuse, NY (US)

(73) Assignee: QUANTIFLY LLC, Syracuse, NY (US)

( * ) Notice: Subject to any disclaimer, the term of this patent is extended or adjusted under 35 U.S.C. 154(b) by 659 days.

(21) Appl. No.: 16/800,959

(22) Filed: Feb. 25, 2020

(65) Prior Publication Data

US 2020/0272837 A1 Aug. 27, 2020

Related U.S. Application Data

(60) Provisional application No. 62/809,839, filed on Feb. 25, 2019.

(51) Int. Cl.
| | |
|---|---|
| *G08G 1/01* | (2006.01) |
| *B64C 39/02* | (2023.01) |
| *G01C 11/02* | (2006.01) |
| *G06V 10/56* | (2022.01) |
| *G06V 10/764* | (2022.01) |
| *G06V 10/82* | (2022.01) |

(Continued)

(52) U.S. Cl.
CPC ............ *G08G 1/012* (2013.01); *B64C 39/024* (2013.01); *G01C 11/025* (2013.01); *G06V 10/56* (2022.01); *G06V 10/764* (2022.01);

*G06V 10/82* (2022.01); *G06V 20/176* (2022.01); *G06V 20/586* (2022.01); *H04N 9/73* (2013.01); *B64U 2101/30* (2023.01); *G06V 10/16* (2022.01); *G06V 20/194* (2022.01); *G06V 2201/08* (2022.01)

(58) Field of Classification Search
None
See application file for complete search history.

(56) References Cited

U.S. PATENT DOCUMENTS

| | | | |
|---|---|---|---|
| 6,340,935 B1 | 1/2002 | Hall | |
| 7,970,644 B2 | 6/2011 | Hedley et al. | |

(Continued)

FOREIGN PATENT DOCUMENTS

| | | | | |
|---|---|---|---|---|
| CN | 101800858 A | * | 8/2010 | ......... H04N 5/23219 |
| CN | 109642795 A | * | 4/2019 | ........... A01B 79/005 |

(Continued)

OTHER PUBLICATIONS

Hsieh, et al., "Drone based Object Counting by Spatially Regularized Regional Proposal Network," 2017 IEEE International Conference on Computer Vision, Oct. 2017.

(Continued)

*Primary Examiner* — Mohammed Rachedine
(74) *Attorney, Agent, or Firm* — Brown & Michaels, PC

(57) ABSTRACT

A method of collecting vehicle parking data includes pre-processing images of a parking area, identifying a vehicle in a parking spot shown in one or more of the images, and detecting a vehicle change in the parking spot in the images collected at different times.

50 Claims, 23 Drawing Sheets

(51) Int. Cl.
*G06V 20/10* (2022.01)
*G06V 20/58* (2022.01)
*G06V 10/10* (2022.01)
*G08G 1/14* (2006.01)
*H04N 9/73* (2023.01)
*B64U 101/30* (2023.01)

(56) References Cited

U.S. PATENT DOCUMENTS

| | | | |
|---|---|---|---|
| 8,605,998 | B2 | 12/2013 | Samples et al. |
| 8,609,895 | B2 | 12/2013 | Saladino et al. |
| 8,873,842 | B2 | 10/2014 | Robinson et al. |
| 8,971,581 | B2 | 3/2015 | Wu et al. |
| 8,989,053 | B1 | 3/2015 | Skaaksrud et al. |
| 9,082,014 | B2 | 7/2015 | Terrazas et al. |
| 9,122,930 | B2 | 9/2015 | Tabb |
| 9,269,022 | B2 | 2/2016 | Rhoads et al. |
| 9,354,778 | B2 | 5/2016 | Cornaby et al. |
| 9,390,621 | B2 | 7/2016 | Cuende Alonso |
| 9,478,063 | B2 | 10/2016 | Rhoads et al. |
| 9,488,492 | B2 | 11/2016 | Samarasekera et al. |
| 9,489,839 | B2 | 11/2016 | Nerayoff et al. |
| 9,529,824 | B2 | 12/2016 | Tusk |
| 9,542,609 | B2 | 1/2017 | Wu et al. |
| 9,576,493 | B2 | 2/2017 | Jarrell |
| 9,589,210 | B1 | 3/2017 | Estrada et al. |
| 9,619,710 | B2 | 4/2017 | Tabb |
| 9,648,197 | B2 | 5/2017 | Aller |
| 9,767,565 | B2 | 9/2017 | Estrada et al. |
| 9,940,836 | B2 | 4/2018 | Scofield et al. |
| 9,984,455 | B1 * | 5/2018 | Fox .................. G06V 20/17 |
| 9,989,965 | B2 | 6/2018 | Cuban et al. |
| 10,410,055 | B2 * | 9/2019 | Wang ................ G06T 7/254 |
| 10,455,197 | B2 * | 10/2019 | Giuffrida ............ G06T 17/05 |
| 2014/0172727 | A1 | 6/2014 | Abhyanker et al. |
| 2015/0205298 | A1 | 7/2015 | Stoschek et al. |
| 2015/0339924 | A1 | 11/2015 | Cook et al. |
| 2016/0027307 | A1 | 1/2016 | Abhyanker et al. |
| 2016/0078759 | A1 | 3/2016 | Nerayoff et al. |
| 2016/0217577 | A1 | 7/2016 | Tom et al. |
| 2016/0307448 | A1 | 10/2016 | Salnikov et al. |
| 2016/0358190 | A1 | 12/2016 | Terrazas et al. |
| 2017/0039424 | A1 | 2/2017 | Nerayoff et al. |
| 2017/0053169 | A1 * | 2/2017 | Cuban .................. G05D 1/104 |
| 2017/0210486 | A1 * | 7/2017 | O'Brien ............... B64C 27/22 |
| 2017/0237948 | A1 | 8/2017 | Quast et al. |
| 2017/0301108 | A1 | 10/2017 | Estrada et al. |
| 2019/0026400 | A1 * | 1/2019 | Fuscoe ................ G06F 30/13 |
| 2019/0026938 | A1 * | 1/2019 | Fuscoe ................ G06T 15/04 |
| 2019/0138849 | A1 * | 5/2019 | Zhang ................ G06F 18/214 |
| 2019/0155973 | A1 * | 5/2019 | Morczinek ............ G01C 11/04 |
| 2020/0168090 | A1 * | 5/2020 | Ayoub ................ G06V 20/52 |

FOREIGN PATENT DOCUMENTS

| | | | | |
|---|---|---|---|---|
| CN | 109598938 | B * | 1/2021 | ............ G08G 1/012 |
| CN | 109918977 | B * | 1/2021 | |
| JP | 2003259339 | A * | 9/2003 | |
| WO | WO-2015080468 | A1 * | 6/2015 | ............ G06T 7/2093 |
| WO | WO-2019090072 | A1 * | 5/2019 | ............ G01C 11/04 |

OTHER PUBLICATIONS

Pix4d, Aerial Photogrammetry with object recognition, as early as 2011, retrieved from https://pix4d.com/ on May 5, 2020.

Datumate, Aerial Photogrammetry, as early as 2013, retrieved from https://www.datumate.com/ on May 5, 2020.

Ag Eagle, AGROBOTIX, Aerial Analytics, as early as 2013, retrieved from https://agribotix.com/, redirected to http://ageagle.com/ on May 5, 2020.

Citilab, Parking Spots from Space, as early as 2017, retrieved from https://www.citylab.com/transportation/2011/11/counting-parking-spots/510/ on May 5, 2020.

Premise, Mapping Reality and Providing Analytics for cities/resources, as early as 1996, retrieved from https://www.premise.com/ on May 5, 2020.

Airbus Aerial, as early as 2019, retrieved from https://www.suasnews.com/2017/05/airbus-creates-new-commercial-drone-services-start-airbus-aerial/ on May 5, 2020.

Aquatic Informatics, as early as 2014, retrieved from http://aquaticinformatics.com/about/ on May 5, 2020.

Icaros—Geospatial, as early as 2007, retrieved from https://www.icaros.us/ on May 5, 2020.

Smops—Pro Land/Drone Survey and Gis, as early as 2015, retrieved from https://www.youtube.com/watch?v=AOkrjsQTVw8 on May 5, 2020.

Flycam Uav, as early as 2017, retrieved from http://www.flycamuav.com/aerial-services/ on May 5, 2020.

Uplift, as early as 2018, retrieved from http://www.upliftdatapartners.com/, redirected to https://www.precisionhawk.com/drone-pilot-network on May 5, 2020.

Flying Cross, as early as 2015, retrieved from http://flyingcross.aero/faa-approved/ on May 5, 2020.

Numina, as early as 2017, retrieved from http://www.numina.co/ on May 5, 2020.

Miovision, as early as 2005, retrieved from https://miovision.com/ on May 5, 2020.

Umass Dartmouth/Siemens, as early as 2015, retrieved from http://news.usa.siemens.biz/press-release/mobility-and-logistics/intelligent-parking-drone-technology-wins-siemens-first-mobilit on May 5, 2020.

Urbiotica, as early as 2012, retrieved from http://www.urbiotica.com/en/ on May 5, 2020.

Parking Park+, Unlimited Parking Solutions, as early as 2017, retrieved from https://www.kimley-horn.com/service/parking-consulting/parking-technologies/park/ on May 5, 2020.

Right Size Parking, as early as 2013, retrieved from http://rightsizeparking.org/ on May 5, 2020.

Urban Footprint, as early as 2009, retrieved from https://urbanfootprint.com/ on May 5, 2020.

Citylab, cities pothole detection by aerial imaging, as early as 2019, retrieved from https://www.citylab.com/life/2015/10/in-a-self-repairing-city-drones-do-the-dirty-work-of-infrastructure-maintenance/411526/ on May 5, 2020.

* cited by examiner

VEHICLE PARKING DATA COLLECTION SYSTEM AND METHOD

REFERENCE TO RELATED APPLICATIONS

This application claims an invention disclosed in U.S. Provisional Application No. 62/809,839, filed on Feb. 25, 2019, entitled "Vehicle Parking Data Collection System and Method". Benefit under 35 USC § 119(e) of the United States provisional application is claimed, and the aforementioned application is incorporated herein by reference.

BACKGROUND OF THE INVENTION

Field of the Invention

The invention pertains to the field of vehicle parking data collection, and more particularly, to vehicle parking data collection using aerial imaging.

Description of Related Art

Vehicle parking data is important to determine parking supply and demand, to determine best land use practices, to efficiently operate and manage parking lots, and to assess the impact of parking on the local traffic network and local economy, among other actions. Conventionally, parking data has been collected manually, by surveying parking areas over time. These methods are labor intensive and time intensive. Some methods, where possible, collect data as vehicles enter or exit parking areas. These methods collect limited data, and cannot determine where cars are parked within a parking lot. More recently, cameras and video recorders have been utilized to survey parking areas, but finding suitable and accessible locations to install cameras and/or video recorders is difficult, and often these cameras and video recorders can only view limited areas due to obstructed sight lines or poor viewing angles.

SUMMARY OF THE INVENTION

A vehicle data collection system and method is disclosed which can facilitate automated, comprehensive data collection over time using aerial imagery. The vehicle data collection system includes novel approaches in imaging apparatus calibration, image processing, computer vision, change detection, and data analytics, to provide vehicle parking data and trends.

In an embodiment, a vehicle data collection system includes: an image preprocessing system configured to produce a tiled, orthorectified orthomosaic of images corresponding to a parking area from a plurality of overlapping images of the parking area; a vehicle identification system configured to identify a vehicle in a parking spot shown in one or more of the images; and a change detection system configured to detect a vehicle change in the parking spot in the images collected at different times.

In another embodiment, a method of collecting vehicle parking data includes: preprocessing images of a parking area to produce a tiled, orthorectified orthomosaic of the images; identifying a vehicle in a parking spot shown in one or more of the images; and detecting a vehicle change in the parking spot in the images collected at different times.

DETAILED DESCRIPTION OF THE INVENTION

Figure 1:
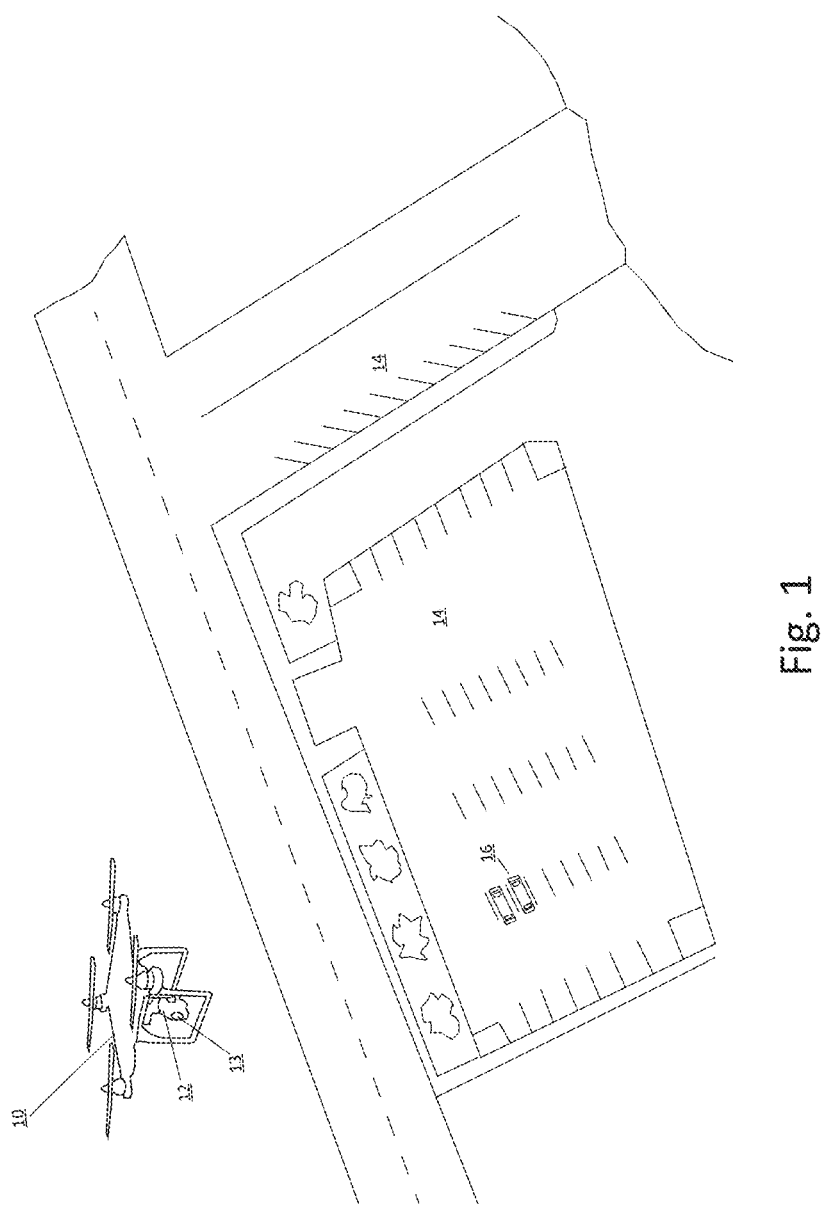
FIG. 1 shows an aerial vehicle equipped with an imaging apparatus passing over an parking area to collect aerial imagery.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The drawings and description are to be regarded as illustrative and non-limiting in nature. The following description is, therefore, merely exemplary. Like reference numerals designate like elements throughout the specification.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, a vehicle data collection system and method is herein disclosed which can facilitate automated, comprehensive data collection using aerial imagery.

FIG. 1 shows an aerial vehicle 10 equipped with an imaging system 12 and optics 13 passing over a parking area 14 to collect aerial imagery. The aerial vehicle 10 shown in FIG. 1 is an unmanned aerial vehicle ("UAV"), though a space vehicle or other now-known or future-developed vehicle capable of moving above the parking area 14 can be used. The term "aerial vehicle", as used herein, accordingly, is not limited to vehicles in the air, and can include vehicles above the Earth but not in air, such as vehicles above the Earth's atmosphere. The parking area 14 is an area designated for vehicles 16 to park, such as a parking lot or a street parking area. The parking area 14 shown in FIG. 1 is a municipal parking lot, though the parking area 14 can include other parking lots, parking spots, or areas where vehicles can be designated to park.

Figure 2:
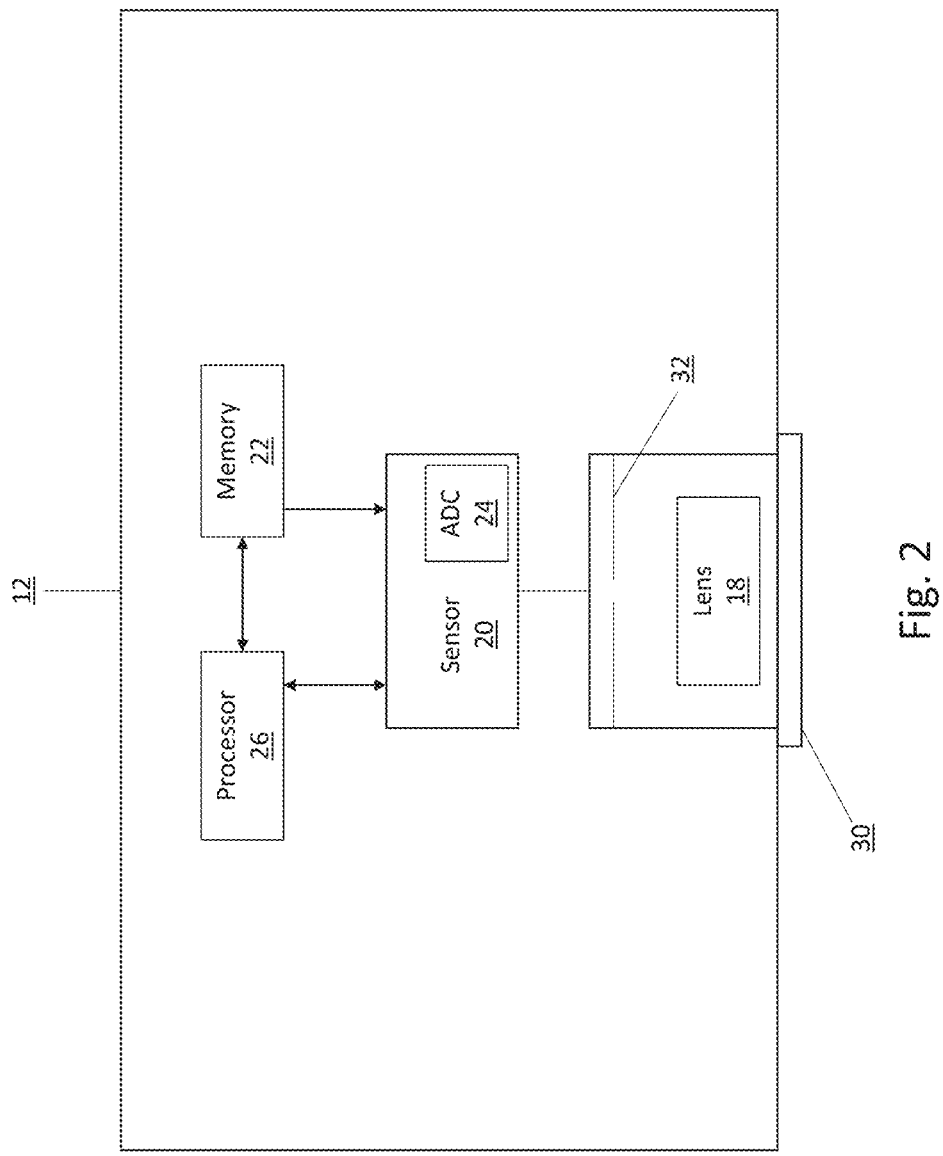
FIG. 2 is a schematic representation of an imaging system, according to an embodiment.

Referring to FIG. 2, the imaging system 12 can include a lens 18, such as a metric lens, to focus light on a digital image sensor 20. The lens 18 can be capable of withstanding stresses of aerial photogrammetric imaging while also having a high level of projection efficiency to optimize an amount of information transmitted, in turn to facilitate achieving primary projection with minimum luma/chroma signal loss Image information collected by the image digital image sensor 20 can be stored in memory 22, which can be integrated with the imaging system 12, or external to the imaging system 12. Image information from the imaging system 12 can be linear raw or compressed. An analog to digital converter ("ADC") 24 can also be included in the imaging system 12 to convert raw analog image data to digital image data, which can be smaller than the raw image data.

Figure 3:
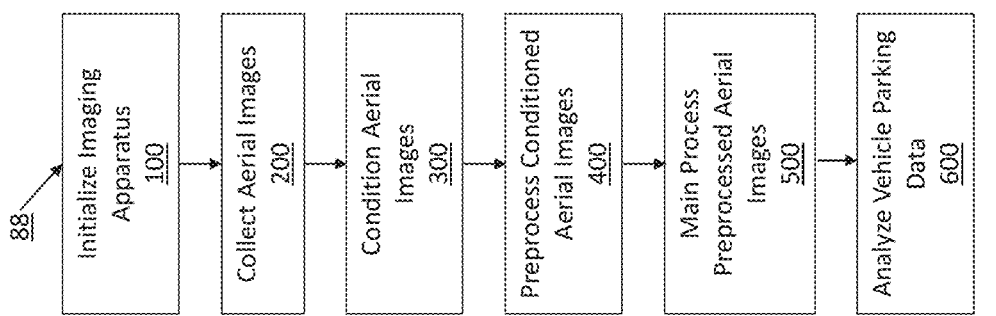
FIG. 3 is a flow chart showing a broad overview of steps for a method of collecting vehicle parking data.

FIG. 3 is a flow chart showing a broad overview of steps for a method of collecting vehicle parking data 88, according to an embodiment. The steps can broadly include initializing imaging system 100, collecting aerial images 200, conditioning the aerial images 300, preprocessing the conditioned aerial images 400, main processing the preprocessed aerial images 500, and analyzing vehicle data 600 determined from the main processing.

Figure 4:
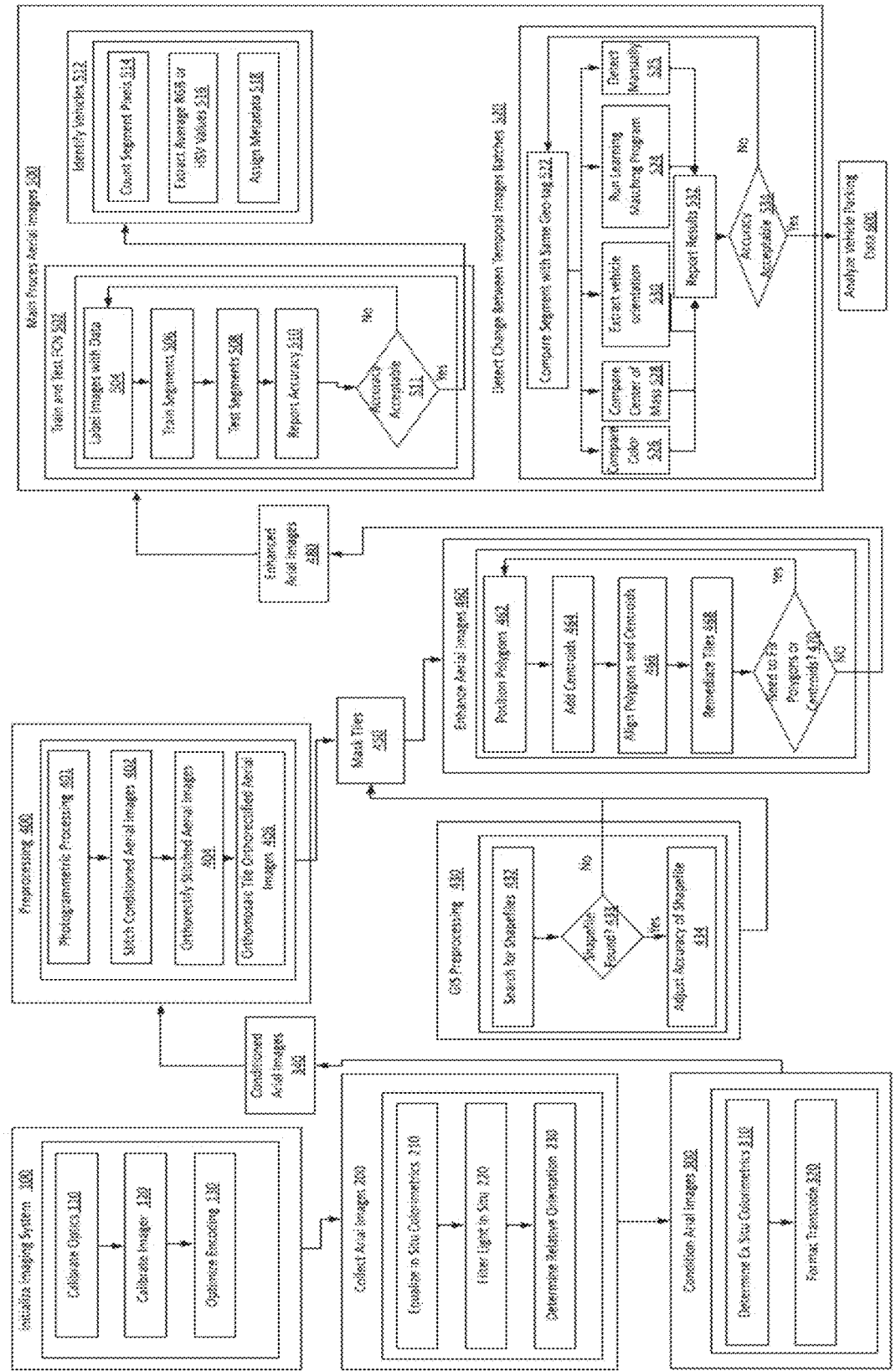
FIG. 4 is a chart representing a vehicle data collection system, according to an embodiment consistent with the method of FIG. 1.

Delving into more detail, FIG. 4 is a chart representing a vehicle data collection system 90 according to an embodiment consistent with the method of FIG. 3. Initializing imaging system 100 can include calibrating optics 110. By choosing the lens 18 and calibrating the lens 18 such that the lens 18 is capable of withstanding stresses of aerial photogrammetric imaging while also meeting the projection efficiency required to transmit a maximum or optimal amount of information, a primary projection can be achieved with minimum luma/chroma signal loss.

Figure 5:
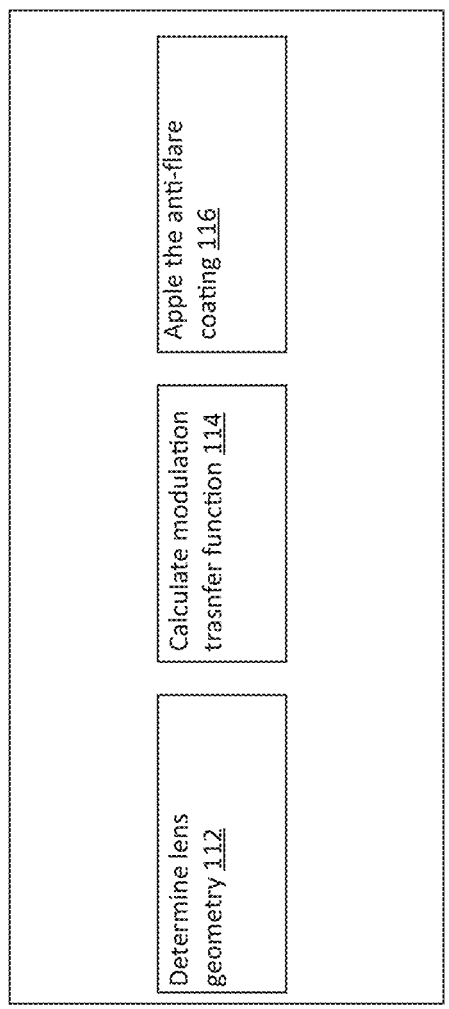
FIG. 5 is diagram showing sub-components of an optics calibrating step, according to an embodiment of the invention.

FIG. 5 is a diagram showing sub-steps of calibrating optics 110, according to an embodiment of the invention. To calibrate optics 110, the geometry of the lens 18 used within the imaging system 12 can be determined 112. Every lens manufactured on the same factory floor, regardless of whether or not it is the same model, has unique morphological characteristics. These lens properties have a significant effect on the refraction of a photon along its path from subject to sensor plane. Because every pixel along the sensor's plane corresponds directly with a given planimetric sample distance of the area being recorded, the accuracy of the photogrammetric result relates to the inverse of this lens geometry. Accordingly, knowing the geometry of the lens 18 can facilitate achievement of survey-grade accuracy of a parking area 14, and can improve geospatial analysis of parking area 14. Utilizing a standard calibration procedure of each lens 18 and/or imaging system 12 under a controlled laboratory environment to determine the "interior orientation" of the lens 18 (i.e., the orientation of the lens 18 with respect to the imaging system 12 and/or the aerial device 10 is one method of correcting these geometrical variances of lens' to achieve more accurate photogrammetry results.

Also to calibrate optics 110, a modulation transfer function ("MTF") can be calculated 114. Because automated photogrammetry relies on referencing common features within a set of images, the ability for the imaging system 12 to resolve the highest amount of detail is directly proportional to the number of successful tie points in a given photogrammetric process. Tie points are common points that are shared between two images, and these tie points are used to correlate images. Increasing the spatial resolution of the imaging system 12 on the aerial vehicle 10 also increases the efficiency of the aerial vehicle 10 by allowing the aerial vehicle 10 to fly at higher altitudes and to cover a larger area along a given flight path. Calculating the MTF before collecting aerial imagery 200 can help determine appropriate or acceptable flying altitudes before beginning an imaging mission. The efficiency gained in this step can ultimately save time and money collecting images, as well as improve the accuracy of computer vision models in generating vehicle data from the processed aerial imagery.

Also to calibrate optics 110, an anti-flare coating can be applied 116. Ensuring the lens 18 utilized for aerial image collection has an appropriate and desirable lens coating to prevent significant flare and fogging can help to mitigate flare phenomena and to maintain a desirable contrast ratio for enhanced or optimal image detail as well as enhanced or maximized reflective index. Lens flare not only reduces apparent detail, which is important for increasing the number of tie points between photogrammetric images, but also decreases computer vision accuracy by warping the pixel structure of vehicles in a final orthorectified image. Accordingly, a certified anti-flare coating can be applied to the lens 18, and the lens 18 can also utilize an optimal reflective index coating to transmit a higher percentage of light between each element within the lens 18.

Referring again to FIG. 4, initializing imaging system 100 can also include calibrating imaging system 120. Calibrating imaging system 120 can enhance an analog signal prior to image information in the analog signal being encoded to a bit stream, such as by the ADC 24. When encoding an analog signal to a bit stream, the ADC 24 discards information as the ADC 24 subsamples an analog signal within the confines of the maximum sample rate of the imaging system 12. By adjusting this signal prior to subsampling, the encoded information can be enhanced to improve photogrammetric and computer vision results.

Figure 6:
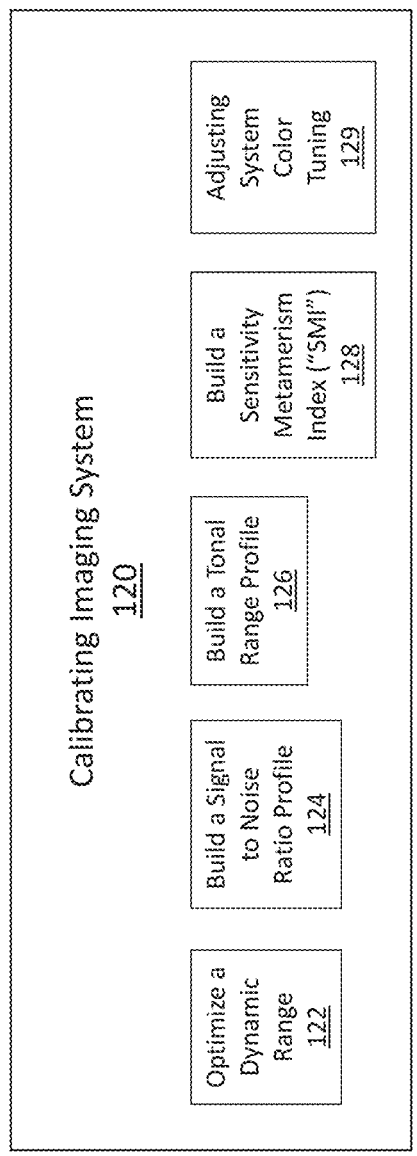
FIG. 6 is a diagram showing sub-components of an imaging system calibration step, according to an embodiment of the invention.

FIG. 6 is a diagram showing sub-components of calibrating imaging system 120, according to an embodiment of the invention. Calibrating imaging system 120 can include optimizing a dynamic range 122 of each digital image sensor 20 in the imaging system 12 to increase the information that passes the ADC encoding process. Each sensor 12 can be tested and a proprietary mixture of pre-ADC inputs can be selected and saved. All sensors 20 and the analog to digital converters 24 that operate within the sensors 20 are bound by technical limitations to collect and transcribe a finite amount of photons to an electron-based bit stream. An ability of each digital image sensor 20 to collect, convert, and record a finite range of photons per pixel well is ultimately what determines a dynamic range of each digital image sensor 20. A dynamic range of each digital image sensor 20 is essentially the range of tonality each digital image sensor 20 is able to record. A sensor is known to have a higher dynamic range when the sensor is able to record a larger number of tonal values. An aerial image containing both extremely dark shadows as well as extremely bright highlights can be a challenge to most digital sensors.

Modern digital sensor manufacturers have begun to create more and more advanced digital sensors with analog to digital converters designed to maintain low signal to noise ratios (SNR) that allow for the sensors to provide useful information in the deeper end of the exposure waveform as well as the computational power to process the more intense stream of photonic energy required to record the exponentially higher number of high value tones towards the upper end of the waveform. Because exposure is quantified logarithmically, the ability to record higher exposure values necessitates more powerful on-board computation whilst simultaneously maintaining a low SNR.

An extremely wide range of exposure values can be encountered in aerial imagery due to a near ninety degree angle to solar exposure during the early and late hours in the day as well as the varying latitude at which missions are executed on the globe. Accordingly, it is beneficial to utilize a digital sensor that is able to capture a wide range of tonality while also maintaining image capture above the noise floor. Noise can ultimately affect the accuracy of both photogrammetry and computer vision algorithms, so keeping the image above the noise floor can improve results.

Accordingly, to calibrate imager 120, the dynamic range of each sensor in the imaging system 12 is optimized 122 to increase the information that passes the ADC encoding process. Each sensor 20 can be tested and a proprietary mixture of pre-ADC inputs can be selected and saved to memory 24.

Calibrating imaging system 120 can also include building a signal to noise ratio profile ("SNRP") 124. Every electronic system introduces an inherent level of minimum noise that is injected into the recorded bit stream. This negative effect can be due to quality of manufactured parts, temperature of the circuit and sensor, or a lack of shielding to electromagnetic propagation from the surrounding environment. Every candidate sensor 20 can be tested to ensure desirable or optimal settings are programmed into the processor 26 of the imaging system 12 for maximum information transfer. A custom SNRP can be built for each sensor 20, thus enhancing the signal for luma and chroma channels to the ADC.

The exact noise profile for various color temperature and exposure index settings can be determined. There are a range of signal input parameters that can affect the SNR, and determining a specific recipe to minimize noise levels can be accomplished through standardized testing and calibration prior to in situ image collection. These various parameter input settings make up the SNRP.

Calibrating imaging system 120 can also include building a tonal range profile ("TRP") 126 and building a sensitivity metamerism index ("SMI") 128. The TRP and the SMI affect the accuracy of change detection, which is described herein below. An ability to detect subtle changes between parked vehicles can directly correspond, and sometimes equate, with an ability to differentiate subtle differences in vehicle color hues. When atmospheric phenomena, shadows with backscatter chromatic effects, and metamers due to variations in incident color temperature, for example, are taken into account, there can be tens of thousands, or more, of vehicle hue variations seen in aerial images.

Accordingly, digital sensors with the ability to detect very subtle changes in both color tone and hue can be chosen for use. After an image is calibrated to take into account most, if not all, of the determining factors for tone and hue, a more accurate discrimination can be made between similar models of car by hue/tone. Any metric that can be utilized to detect a change between two images can be useful.

By taking multiple images of calibration charts under a standardized and consistent illuminate, the specific characteristics of the imaging system 12 can be determined using various basal imaging system settings. Multiple images of the same chart can be taken using a different ISO setting for each image. After using every available ISO setting available within the imaging system 12, the entire tonal range of the imaging system 12 can be known. The TRP can help to determine the upper and lower limits of the abilities of the imaging system 12 as well as to determine the optimal ISO setting.

Calibrating imaging system 120 can also include adjusting system color tuning ("SCT") 129, which is essentially the overall image quality (IQ) recipe using various image quality parameters that can be changed to provide the most accurate representation of a scene to be captured by the imaging system 12. Accuracy of photogrammetry and computer vision applications is dependent on the ability to find harmony amongst all the available system configurations and settings. This harmony can be achieved through experience, rigorous testing, and validation via field tests.

Referring again to FIG. 4, initializing imaging system 100 can also include optimizing encoding 130. Some images are captured in linear RAW format, and in some other instances, particularly with UAVs, the recorded image format can necessitate the on-board processor 26 to encode to a lossy image compression format such as JPEG (Joint Photographic Experts Group). When encoding to formats such as JPEG, the image can be optimized prior to encoding in order to overcome loss in detail due to compression artifacts. The permanence of this loss in detail is referred to as "baking in" the characteristics of the image into the compression stream. After the image is compressed, there can be no chance to regain this detail.

Figure 7:
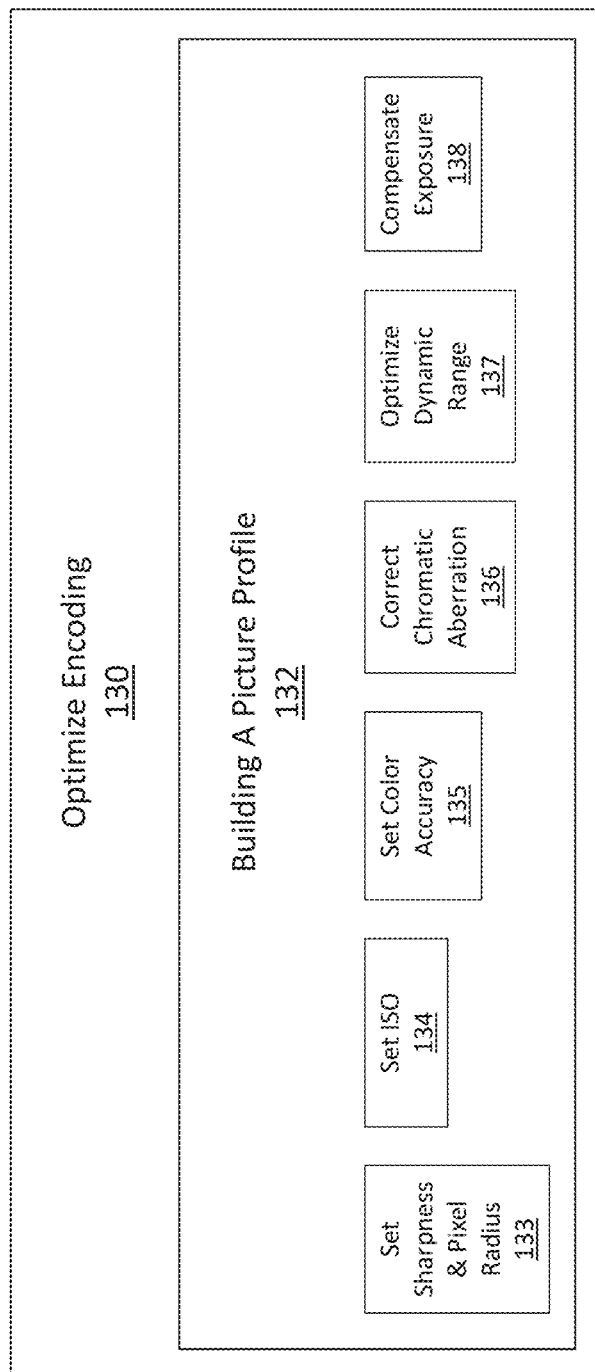
FIG. 7 is a diagram showing sub-components of optimizing encoding

FIG. 7 is a diagram showing sub-components of optimizing encoding 130, according to an embodiment of the invention. Optimizing encoding 130 can include building a picture profile 132. Due to the permanence of image compression, it is beneficial to compensate for the loss in detail prior to bit stream exit from the ADC 24 in order to maintain accuracy in ensuing photogrammetry and computer vision processes.

Picture profile parameters which affect photogrammetry and computer vision accuracy include sharpness and a pixel radius setting of the sharpness, ISO (exposure index), color temperature, chromatic aberration, dynamic range, and exposure. Sharpness and pixel radius setting (e.g., 0.5 radius) can be set 133 to enhance the pixel features which may or may not reach the threshold of the auto photogrammetry process depending on the contrast ratio between successive or neighboring images in each transect. The ISO can be set 134. A lower ISO can yield a lower luma/chroma SNR. A color accuracy can be set 135. A high color accuracy can yield a low chroma SNR. Chromatic aberration can be corrected 136 to remove chroma dissonance between successive images within the same transect or neighboring transect. Dynamic range can be optimized 137 to highlight repair, which compensates for highest exposure value within an image and reduces higher exposure value contrast reducing the risk of exceeding the high values within the waveform, to 18% reflectance, which is a validation of a spectrally neutral "middle gray" value return on the waveform monitor, and to lift repair, which compensates for the deepest shadows within a high dynamic range image mitigating the risk of a loss of information due to underexposure prior to lossy compression. Exposure can be compensated 138 to overexpose a digital image by a predetermined amount to find an optimal balance between the gain (>80% IRE) and lift (<20% IRE) within the waveform. What might be lost in the extreme high end of the waveform is gained by the increase in information within the shadows as well as chroma channels, however, care must be taken to find the optimal balance between what is forfeited from either the gain and lift.

Next, referring again to FIG. 4, aerial imagery can be collected 200. Collecting aerial images 200 can include capturing the aerial images, for example, with aerial vehicle 10 flying over parking area 14. Aerial vehicle 10 can fly over parking area 14 to capture aerial imagery representing the entire parking area 14. Each aerial image can overlap other aerial images to reduce or avoid gaps in coverage, and to increase or maximize viewing angles unobstructed by undesired vehicles intervening between the vehicle and the vehicles that are the subject of the. Undesired vehicles, for example, in the case of a parking area, could be trees, parking lights, or larger vehicles obscuring smaller vehicles from some angles. Further, adjacent aerial images are overlapped to create or increase tie points. As discussed above, tie points are common points shared between two images, and these tie points are used to correlate the overlapping images. The higher the number of tie points, the more matching that can be made between each successive image in the image sequence used to build an orthomosaic. The more overlap between each successive image, the higher the number of tie points, therefore, the better quality and accuracy of the orthomosaic. In some embodiments, adjacent aerial images include at least 60-70% overlap.

One or more aerial vehicles 10 can fly over a parking area in any desired pattern to cover the parking area appropriately. The flying pattern can be predetermined, such that the vehicle flight pattern can be preprogrammed and automated. The aerial vehicle 10, or fleet of aerial vehicles 10, can take off, fly a pattern to collect aerial imagery based on a flight pattern and time of flight, and return to a home base. The collected aerial images can be retrieved by any now-known or future-developed method, in real-time, in-flight, or after returning to the home base.

Images collected during a single pass or series of passes over parking area 14 is referred to herein as a "temporal batch". A "temporal batch" is a batch of images captured of the parking area 14 during a single flyover event. For example, a plurality of images taken during a relatively short time period (e.g., a 2-10 minute range) during a flyover or pattern of flying over, to capture an entire, parking area, would constitute a single temporal batch. A second flyover, or pattern of flying over, at a later time (e.g. one hour later) would constitute a second and different temporal batch. Multiple "temporal" batches are collected for analysis.

Collecting aerial images 200 can include equalizing in situ colorimeterics 210, which includes homogenizing images captured on location to a standard intended to facilitate uniformity of the images across multiple flight missions, or time batches of images, despite environmental differences. IEEE standard image calibration charts can be used to calibrate and validate image quality across multiple missions.

Figure 8A:
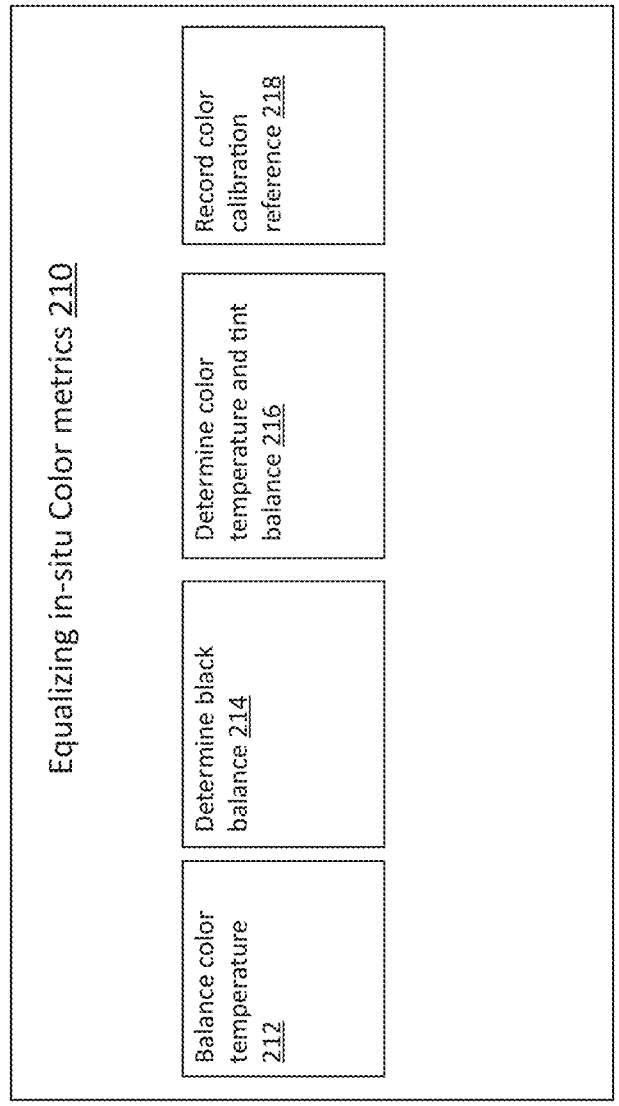
FIG. 8A is a diagram showing steps of equalizing in situ colorimetrics, according to an embodiment of the invention.

Referring to FIG. 8A, steps of equalizing in situ colorimetrics 210 are shown. Equalizing in situ colorimetrics 210 can include balancing color temperature 212 using the settings of the imaging system, and determining black balance 214.

Figure 8B:
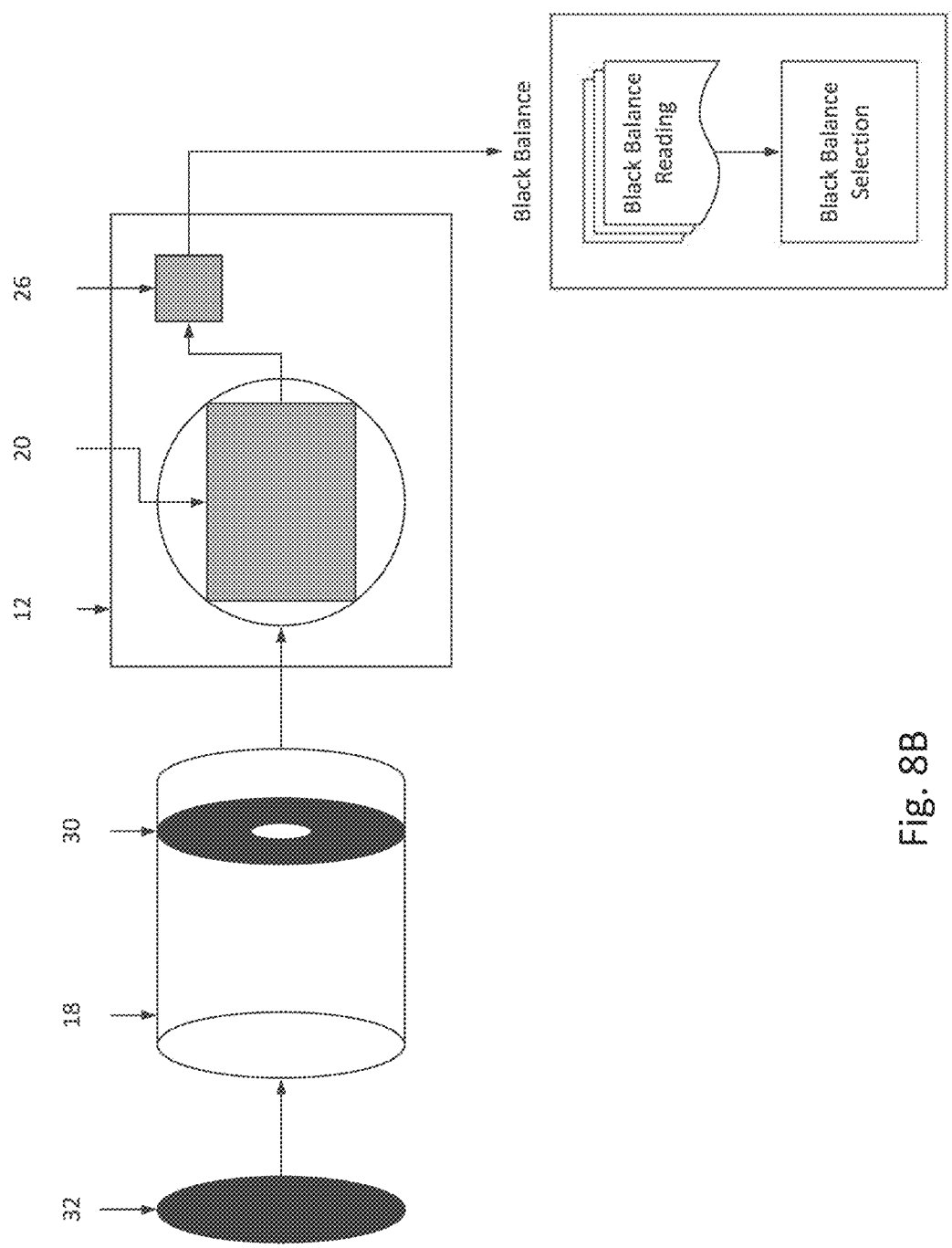
FIG. 8B schematically illustrates a process of determining a black balance reference, according to an embodiment of the invention.

FIG. 8B schematically illustrates the process of determining a black balance reference 214. After the correct color temperature reading is recorded and imprinted onto the image processor 26, and the imaging system 12 is at operating temperature in the imaging environment, an iris 30 (see FIG. 4) is minimized, a lens cap 32 is placed to cover the lens 18, and the exposure index is reduced to the desired setting determined during the SNRP tests in order to achieve absolute minimum exposure value. The resulting ADC signal is then used as a reference for "true black" by the processor 26, thus allowing the system to optimize the SNR compensation through a low noise amplifier (not shown). The low noise amplifier is a tool that some imaging systems incorporate in order to minimize computational SNR reduction.

Figure 8C:
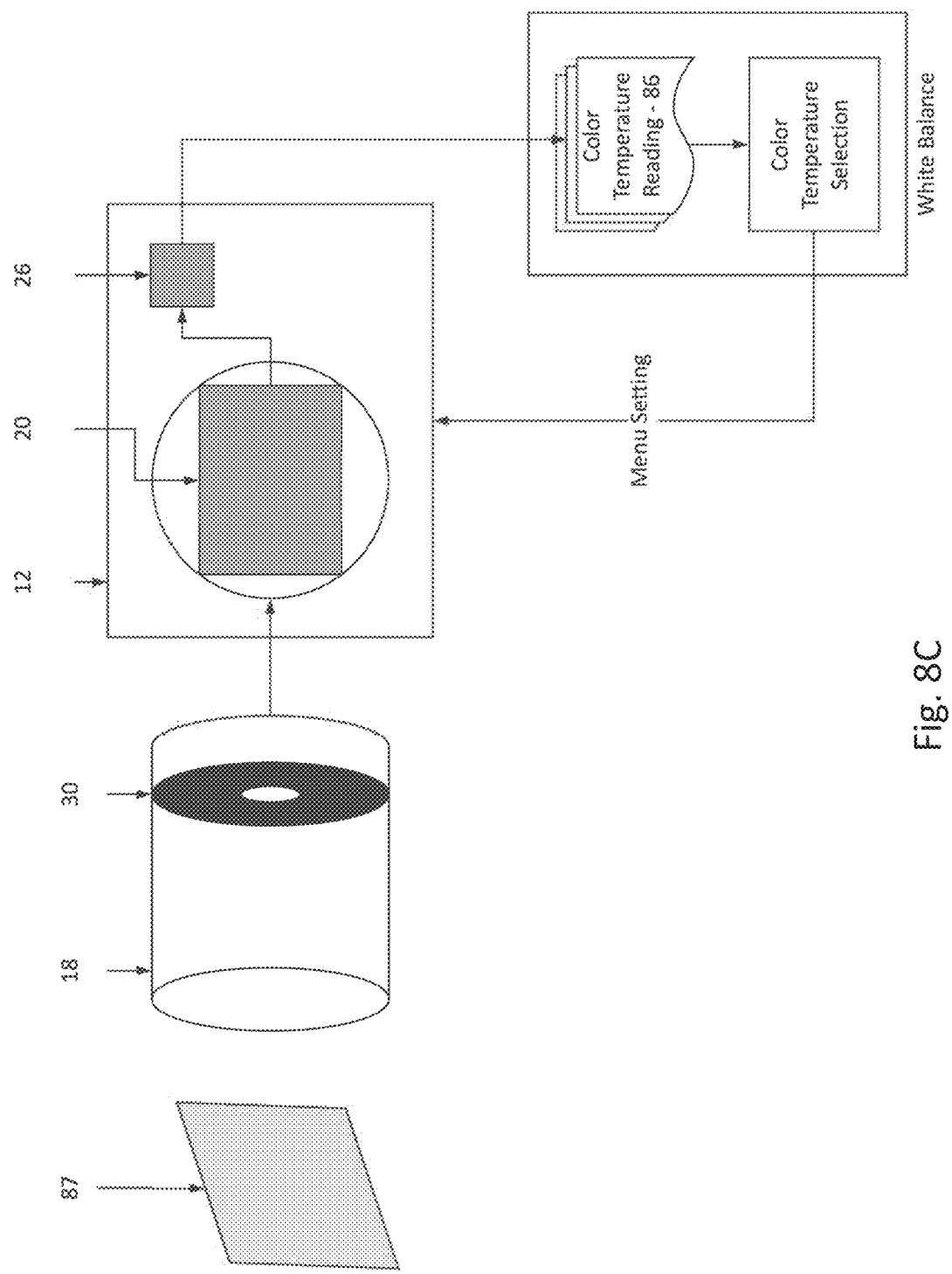
FIG. 8C schematically illustrates a process of determining color temperature and tint balance, according to an embodiment of the invention.

Still referring to FIG. 8A, and also to FIG. 8C, equalizing in situ colorimetrics 210 can also include determining a color temperature and tint balance reference 216. Both the color temperature balance and tint balance reference can be recorded simultaneously in situ. With the iris 30 opened, an image is captured of a certified spectrally neutral white balance card 87 for later reference and used to determine an optimal color temperature balance and an offset between a magenta and green chroma. Although a white point can be determined based on the temperature of the illuminate, the chroma axis between magenta and green is still able to shift either way. By taking a reference image in both incident light as well as shadow, color temperature and color tint settings can be determined to maximize accuracy of color representation.

Figure 8D:
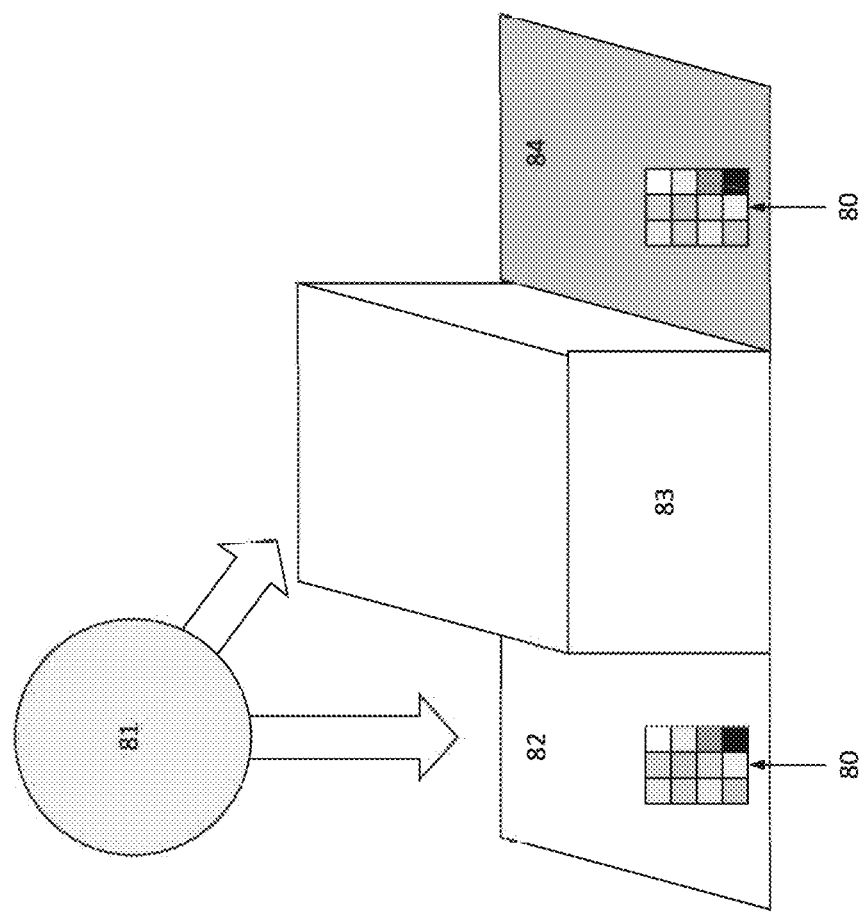
FIG. 8D illustrates an aspect of recording a color calibration reference, according to an embodiment of the invention.

Still referring to FIG. 8A, and also to FIG. 8D, equalizing in situ colorimetrics 210 can also include recording a color calibration reference 218. A spectrally neutral and certified color temperature balance calibration chart 80 can be used to find a neutral color balance, such as a white point color balance, prior to true color calibration in later steps. Finding this neutral color balance can be particularly useful when using an imaging system that is forced to encode to a lossy format, such as JPEG, wherein the color temperature balance is "baked" into the image with an inability to later shift the color temperature. Any deviation from the correct color temperature prior to a JPEG encode can introduce an unacceptable level of chromatic noise and compression artifacts.

FIG. 8D illustrates the sun 81 emitting light into an area of direct sunlight 82, and an area of shadow 84 occluded by an object 83, such as a building. An image of the color temperature balance calibration chart 80 can be captured in the direct sunlight 82 in situ as well as shadow 84 in situ. Capturing the calibration chart 80 in both the direct sunlight 82 and the shadow 84 allows for proper color balance in both the exposure under sunlight as well as within the blue color cast of the shadow 84 which can have a significantly positive effect on the accuracy of color representation as the sun moves throughout the day. Exterior color cast does not interfere with the incident light of interest in order to optimize the results for highest accuracy. The entire frame of the image can be filled with the calibration chart 80 and focus can be degraded in order to provide a fully neutral image as well as to compensate for irregularities within the chart's observable surface through a process called "reflectance ray blending" ("RFB").

Correct color temperature balance is a foundation of proper color representation. A color temperature reading can be recorded within the same time frame as each series of aerial vehicle paths, for example, just before and after every imaging mission (i.e. aerial vehicle flight) in order to account for shifting color temperature readings of solar propagation and chromatic effects of the Earth's atmosphere. A color temperature setting can be entered into the imaging system in situ just moments prior to image acquisition and an image is taken of the color temperature balance calibration chart 80 as a reference for ex situ adjustments.

The recorded image of the calibration chart can be used in later steps ex situ to calibrate each chroma channel to provide a highly accurate representation of color. This method is particularly beneficial when using a lossy format such as JPEG because it realigns the color channels to best represent a limited palette of available colors within a smaller color space. A node may be created ex situ within color calibration software for both incident light and shadow, each of which can align successive temporal layers using an accurate and consistent color representation in order to facilitate the best results in the change detection process. When all transects and temporal layers are calibrated using this standardized colorimetric process, higher accuracy within the photogrammetry and computer vision process as well as significant time and cost savings can be achieved.

Referring again to FIG. 4, collecting aerial imagery 200 can also include filtering light in situ 220. Certain characteristics of light rays entering an imaging system can be selectively controlled by utilizing optical filtration prior to the light rays crossing a threshold of the lens 18 and encountering an imaging sensor 20. Reflective light such as specular highlights, standard/diffuse reflections, infrared light, and the luma/chroma reflective index of the Earth's atmosphere (haze) are all unique photonic phenomena which can degrade the accuracy of photogrammetry and computer vision, and which can be reduced to some degree using optical filtration.

Figure 9:
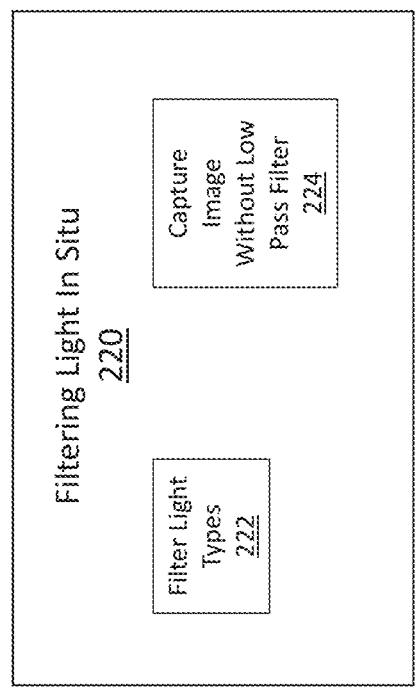
FIG. 9 is a diagram showing steps of filtering light in situ, according to an embodiment.

Referring to FIG. 9, filtering light in situ 220 can include filtering light types 222, such as reflected light, infrared light, and ultraviolet light. In some embodiments, a polarizer 32 (see FIG. 2) can eliminate a significant percentage of extraneous reflected light coming from vehicles in a parking area. Polarizing filters can be most effective when operating at a ninety degree angle from a light source. Any elimination of reflection from the surrounding environment from the reflective emulsion can increase the number of tie points. Reflections in vehicle emulsion cause errors in the auto photogrammetry process and might also render an inaccurate orthorectified representation of the temporal layer, thus inducing errors into the computer vision process.

During solar apex at the mid-day interval, global illumination contains a significant percentage of infrared light. Most digital sensors are sensitive to this lower end of the color spectrum and this infrared light can distort and degrade color information thereby degrading the change detection accuracy.

Depending on the altitude of the aerial vehicle 10 used for image capture, there can be a significant volume of atmosphere between the ground and the vehicle. This incremental increase in atmospheric volume, combined with the local air quality and moisture content, can cause significant degradation in image contrast, color quality, and detail.

Filtering light in situ 220 can also include capturing images without an optical low pass filter ("OLPF") 224, which is typically installed between a rear element of the lens 18 and the sensor 20, to reduce or soften detail in the image. The OLPF is intended to mitigate or reduce the effects of moire and false colors caused by detailed patterns. In the aerial images of parking areas, however, regularized fine patterns are often not encountered, so more detail can often entail more accurate results. Removing the OLPF from the imaging system 12 helps maximize the amount of minute feature detail within each recorded image. By utilizing an irregular CMOS sensor unwanted moire and false color can be bypassed altogether to focus on providing the sensor with optimum projection of information.

Referring to FIG. 4, collecting aerial imagery 200 can also include determining relative orientation 230. To assign every pixel an accurate geolocation and time metadata, all external geometric and temporal values relative to the projected coordinate system are determined. This projected coordinate system is be imported into a GIS software for survey-grade geospatial analysis by computer vision and image processing algorithms to provide verifiable analytical data, as described further below.

Determining relative orientation 230 can include determining exterior orientation. The orientation of the imaging system 12 is recorded relative to a projected coordinate system. This orientation includes kappa, omega, and phi metadata. Often this metadata is recorded by a stabilization system or gimbal (not shown) of the imaging system 12. Any discrepancy between the exact position of a Global Navigation Satellite System ("GNSS") antenna base (phase center) and a focal point of the sensor 20 can be known to within a high degree of accuracy. All of these separate values form geometric components used to calculate a position of the imaging system in space relative to the projected coordinate system.

In order to achieve survey-grade accuracy, the imaging system 12 can be equipped with a calibrated receiver of a GNSS with the ability to record the location of the aerial vehicle 10 in three dimensional space at a minimum frequency of 1 Hz. In other words, every time the imaging system 12 records an image, the GNSS also records a very accurate geolocation tag (geotag) associated with this image.

The time that an image is recorded can be correlated to the time a georeference is recorded. All subsystems on the aerial vehicle 10 can utilize a coordinated time table to enable correlation of events during a later photogrammetry process. Three different solar time standards can be used in the image capture process:

1. GPS Time—atomic coordinated time on-board space-based radionavigation systems;
2. Universal Coordinated Time—this time standard is used on our GNSS recorder; and
3. Local Time—this time standard is used for local parking behavior analysis.

Referring again to FIG. 4, after collecting aerial images 200, the aerial imagery can be conditioned 300. The collected images in an original, raw form, can be taken from an RGB sensor aboard the aerial vehicle 10, and calibrated to correct and even out exposure profiles for each temporal batch of images. A custom RGB image optimization tool compensates for exposure changes between each image within a temporal batch to prepare the mosaic of images for computer vision analysis. Compressing a dynamic range within each image to within a specific range optimizes the performance and decreases error. Conventional automatic exposure compensation tools are not specifically tuned to prepare a mosaic of images for computer vision analysis. Conditioning also makes possible an accurate orthomosaic compatible with GIS and a vector map experience.

Conditioning aerial images 300 can include determining ex situ colorimetrics 310. The calibration of each temporal batch of images can be verified against reference images recorded in situ using a standardized series of calibration charts, to ensure uniformity across all temporal batches of images.

Figure 10:
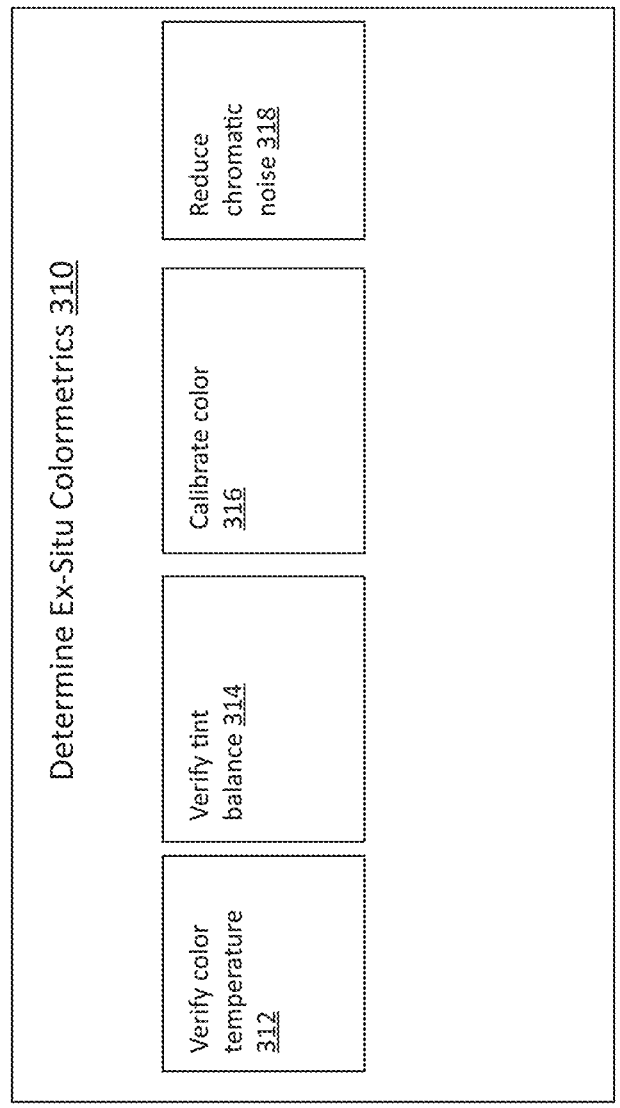
FIG. 10 is a diagram showing steps of determining ex situ colorimetrics, according to an embodiment.

Referring to FIG. 10, determining ex situ colorimetrics 310 can include verifying color temperature 312 by taking a series of color readings of recorded images, producing an average reading, and applying the average to the overall image set. A separate set of color temperature readings are taken from the spectrally neutral white balance card 87 recorded under incident shadow in situ prior to image collection. This reading is applied to a luminance node restricted to the lowest ends of the waveform in each image. The color temperature dissonance cast by shadows onto vehicles at different times of the day is removed. This node has both a luminance and chrominance key, which are configured to balance the color temperature within the shadows.

After the color temperature measurement is verified and applied to the image, tint balance is verified 314. The same recorded spectrally neutral white balance card 87 is used to measure the green and magenta balance in order to normalize both the x and y axis of the color white point scale.

After the image is neutralized of overall color cast and chroma shifts, color is calibrated 316. Using the image recorded in situ of the standardized color calibration chart, each color channel is calibrated, and an accurate representation of color is determined. The more calibrated color samples present on the color calibration chart, the more accurate the color reproduction. This final calibration step further regularizes the image sets across all temporal layers facilitating a significant increase in change detection accuracy.

Chromatic noise can be reduced or eliminated 318. This process removes erratic pixel coloration inherent in the on-board image processor. Chroma noise can greatly degrade the color accuracy of a pixel block. Because computer vision, as described herein below, utilizes pixel color information in order to detect change between each temporal pixel block, having a uniform and consistent representation of color between each temporal layer increases accuracy of change detection.

Referring again to FIG. 4, conditioning aerial imagery 300 can include formatting transcode in RAW format 320. Each successive translation of image information can cause loss of information, so limiting the number of transcode generations can improve image quality. All aerial imagery can be captured in linear RAW format to record as much information as possible and to provide the most flexibility ex situ during conditioning of aerial imagery 300. Using an image format transcoding tool, all calibrations can be applied within the RAW space and transcode to an uncompressed TIFF format after final calibrations have been applied.

Referring again to FIG. 4, conditioned aerial images 340 can undergo a series of steps of preprocessing 400. Photogrammetric processing 401 is one such preprocessing step.

Photogrammetric images are produced by stitching 402 the conditioned images 340 from each temporal batch into a single orthomosaic image (i.e., geotiff). Now-known and future-developed photogrammetry methods can be used. Creating photogrammetric images allows elimination of duplicate vehicles in many overlapping images to avoid counting the same vehicle twice. This "stitching" process is useful to generate an orthorectified master image. Photogrammetry is also useful to represent a final master image within the vector map.

The orthomosaic images are then orthorectified 404 to produce orthorectified orthomosaic images. According to this step 404, the orthomosaic images are corrected for perspective shift in order to generate a consistent nadir (i.e., straight down) perspective. Now-known and future-developed orthorectification methods can be used. (Orthorectification is a necessary step in order to eliminate perspective warping between each temporal batch so that the computer vision and change detection components will function properly. Orthorectification is also necessary to remove any occlusion which might obstruct the view of parked vehicles because the vehicles are behind tall synthetic or natural objects.)

The orthorectified orthomosaic images can then be orthomosaic tiled 406 to produce decks. According to this step 406, the large orthorectified orthomosaic images are segmented into smaller geotiff files called "tiles". These tiles are organized according to temporal batch, each of which is called a "deck". The orthomosaic tiling 406 and segmentation of each orthorectified orthmosaic image into smaller image files can be automated to reduce the computational load to process each orthomosaic image. The orthomosaic tiles are significantly smaller than the orthorectified images, which can be too large to process. The computational requirements demanded by larger orthorectified images are significantly higher than the computational requirements demanded by smaller orthomosaic tiles.

Referring still to FIG. 4, GIS preprocessing 430 includes searching for a shapefile of a predetermined geographical area 432, such as a desired municipality. Municipal shape files may contain, e.g., city street boundaries and parking areas, as well as land use. This shape file is used in conjunction with georeferenced imagery in order to ensure proper alignment with the official municipal maps. It should be noted that the georeferenced imagery can alternatively be aligned properly to the municipal map using standard manual calibration to ground control points. If the shape file is found at decision box 433, then at step 434, the accuracy of the shape file can be adjusted by controlling a coordination system.

Figure 11:
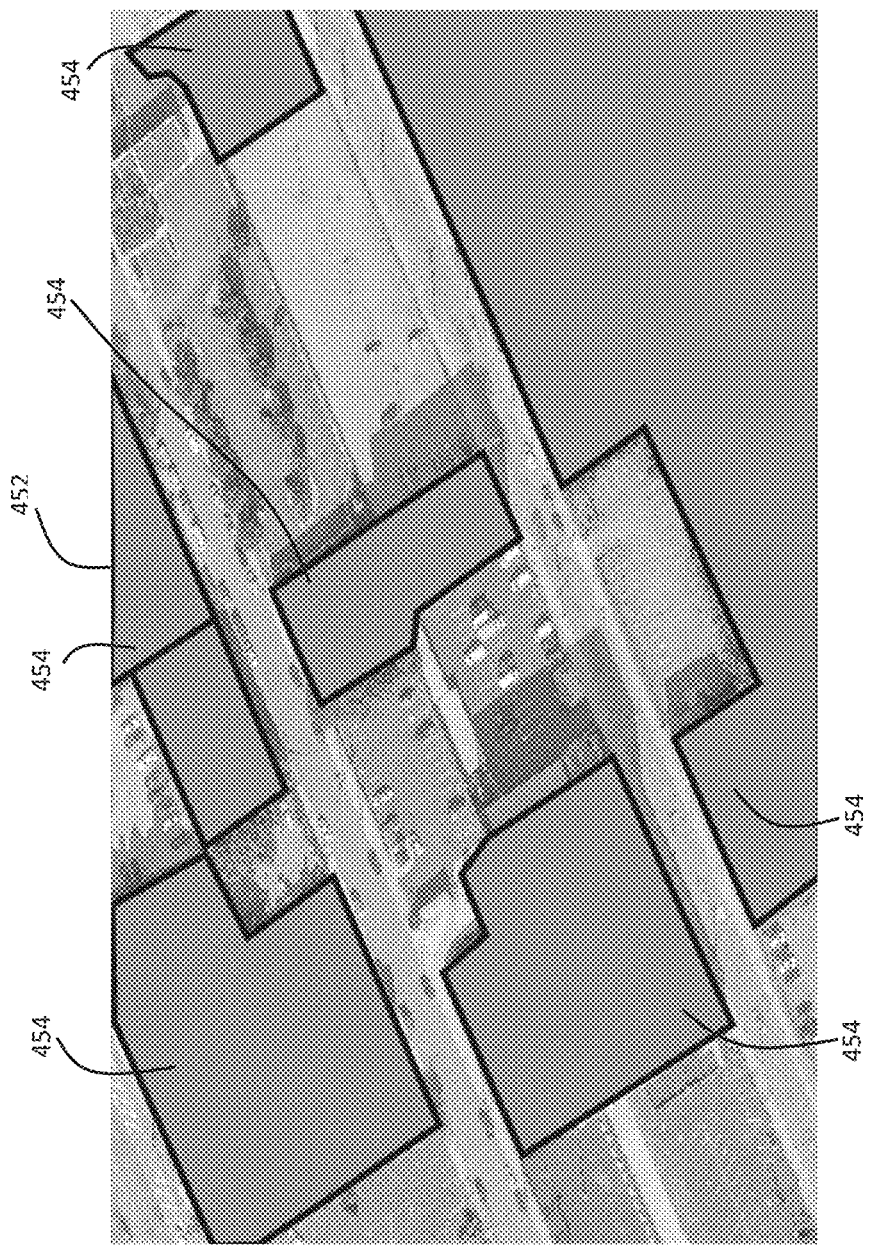
FIG. 11 shows parking areas of a municipal area with masks covering non-parking areas, according to an embodiment.

The shape file can be used to mask the tiles 450 to cover and/or crop out some or all geographic features within each tiled image that is not a parking area. Unnecessary and private land uses can be subtracted from each tile before analysis, which can reduce computational requirements (e.g., by reducing extraneous pixels within each tile), reduce error, and reduce or avoid privacy issues. Private areas, non-parking areas, and other unnecessary areas are covered (i.e. masked) by predefined shapes (e.g., polygons). FIG. 11 shows parking areas of a municipal area 452 with masks 454 covering non-parking areas. Geotagging both the images and the shapes provides a focused area of study for the parking areas in any given area, such as within a given city.

Figure 12:
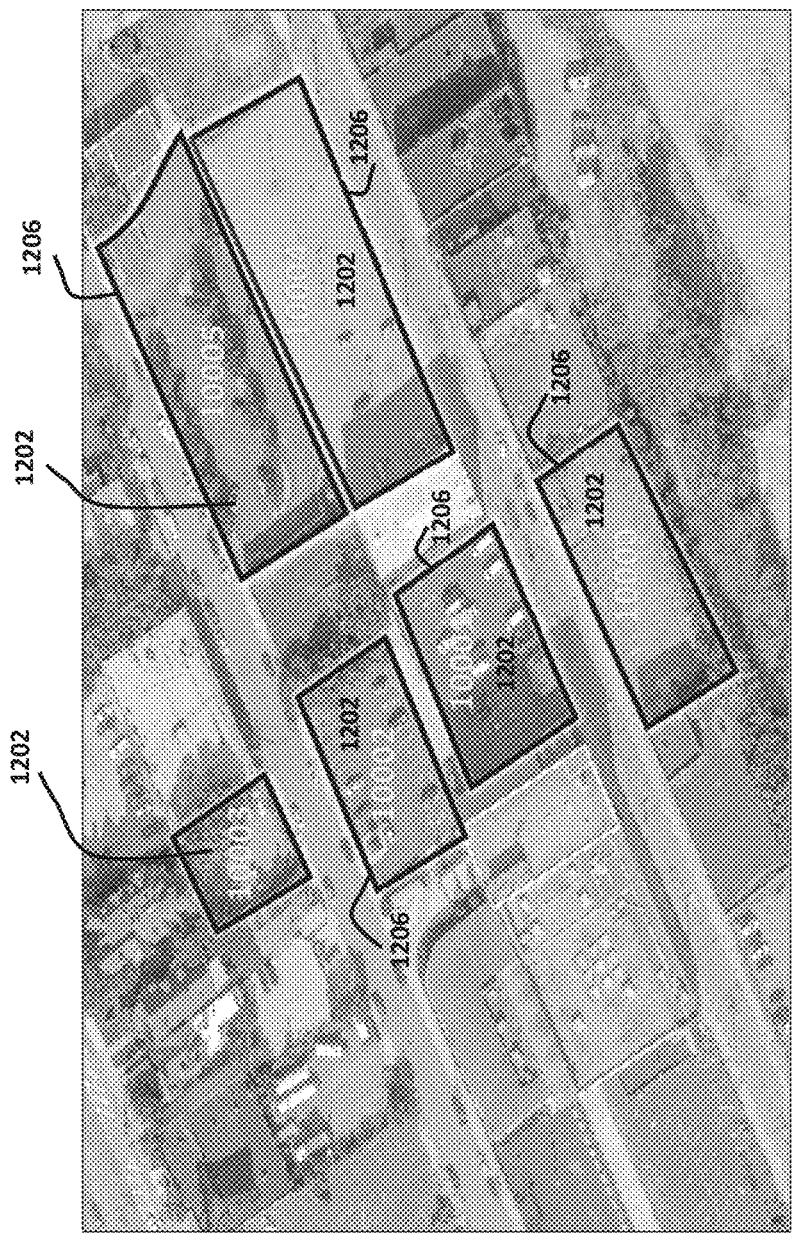
FIG. 12 shows parking areas with parking area polygons positioned around a boundary of each parking area, according to an embodiment of the invention.

Still referring to FIG. 4 each deck of masked tiles can next be enhanced 460, such as by using GIS. Enhancements to the masked tiled images can be used to train a vehicle recognition network, as discussed herein below. Referring to FIG. 12, which shows parking areas 1202, parking area polygons 1206 are positioned 462 around a boundary of each parking area 1202. To better organize these polygons 1206, additional metadata, such as parking type, can be added. Some examples of parking type include off-street and on-street. Some other metadata that can be added to correspond with each polygon include area and descriptive information such as adjacency to downtown, adjacency to a street, etc.

Figure 13:
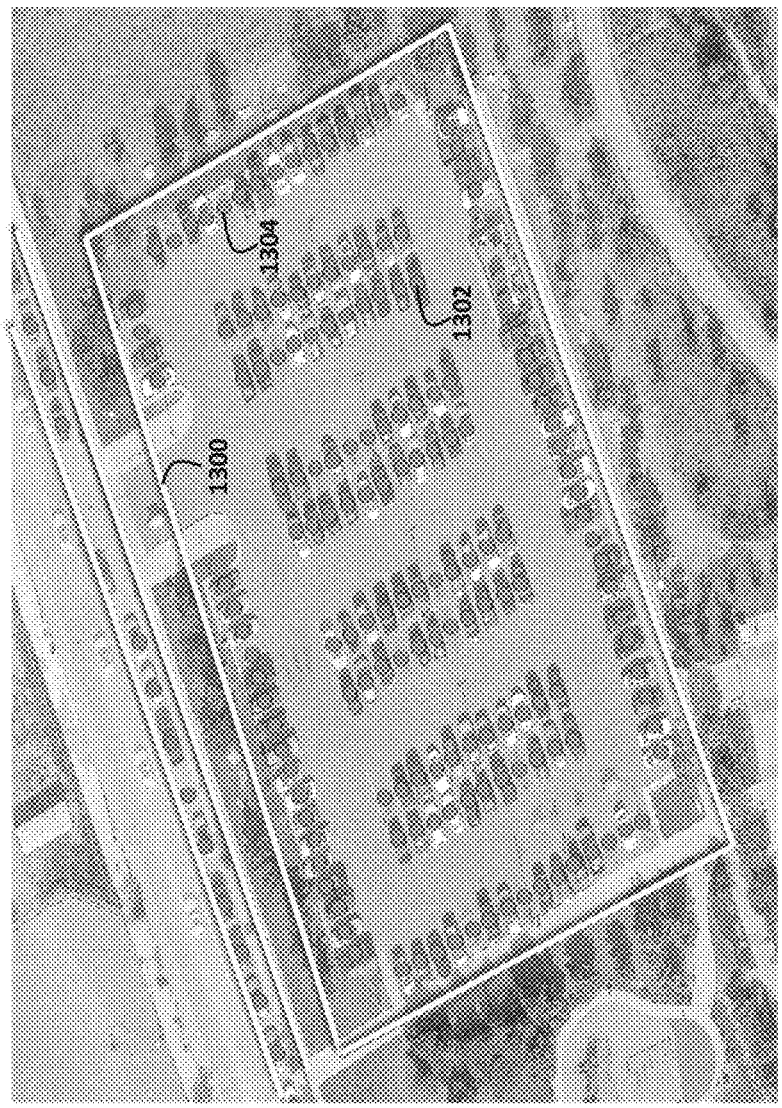
FIG. 13 shows a parking area with a centroid added to the geometric center of each parking spot in the parking area, according to an embodiment of the invention.

Still referring to FIG. 4, and also referring to FIG. 13, which shows a parking area 1300, a centroid 1302 can be added 464 to the geometric center of every parking spot 1304 within each parking area polygon 1206. Each centroid 1302 can be assigned a unique geotag which is ultimately used to improve computer vision accuracy, as described herein below. Since all temporal layers within a given mission are aligned to within one tenth of a pixel using, for example, a co-registration and georeferencing tool during photogrammetric processing, there is no need to add centroids 1302 to the remaining temporal layers as the same centroids 1302 can be referenced.

Still referring to FIG. 4, parking area polygons 1206 and centroids 1302 can be aligned 466. This alignment is a control to rapidly test and validate the accuracy of further image sets. Image sets might change qualities from mission to mission and flight to flight, so quality and consistency can be verified with a small sample from this dataset. A first binary code can be assigned for a vehicle in a position in the parking spot 1304, and a second binary code can be assigned if no vehicle is in position in the parking spot 1304. For example, if a vehicle is there, then the code can be "1" and if the vehicle is not there, then the code can be "0".

Validating and testing the initial temporal layer (e.g., control layer) should validate and test all other layers in the same mission, as long as all flight and image parameters are the same.

Next, tiles can be remediated 468. If necessary to reduce file sizes that may be too large for a machine learning algorithm to efficiently handle, the orthomosaic can be further tiled to create files of manageable size. In one embodiment, the entire orthomosaic can be loaded into a tile server, and the computer vision and machine learning algorithms can be run. In another embodiment, a tile deck can be created to maximum pixel ratio specifications that processing memory allows for stable operations, and then the tile pixel ratio can be divided into the total pixel ratio of the entire orthomosaic. This latter embodiment is less efficient than the former embodiment as this latter embodiment includes exporting each area of the orthomosaic that has been sliced as a unique "strip" of an image and analyzing the "strip" separately. Each area is exported and analyzed because when slicing the orthomosaic, there is a high statistical likelihood that the slice will in fact cut through the middle of many cars thus inducing errors in the parking count.

Next, still referring to FIG. 4, if the polygons and centroids need to be fixed, at decision box 470, then each deck of masked tiles can be enhanced again using GIS 460. If the centroids and polygons are acceptable, the preprocessed images 480 are processed to count cars and detect change between corresponding temporal batches.

After image preprocessing 400 is complete, as well as GIS processing 430, masking tiles 450, and enhancing aerial images 460, if necessary, image main processing 500 occurs such that a computer, using vehicle recognition methods and advanced computer vision technologies, automatically identifies a vehicle in the orthorectified masked images and detects changes between temporal batches of images of the same parking area.

As an example, a Fully Convolutional Network (hereinafter "FCN"), which is a deep learning method for segmentation, can segment the images with the intent that each segment contains a single vehicle, or close to a single vehicle. The architecture of the FCN in one embodiment has two main parts—an encoder and a decoder. The encoder encodes an image using a set of deep learning operations, such as convolution and deconvolution, to output a latent representation. The decoder also uses a set of deep learning operations, such as convolution and deconvolution, to construct a segmentation map from the latent representation.

To facilitate training and testing of the FCN 502, images can be manually labeled or annotated 504, then a vehicle segment can be trained 506, tested on unseen images 508, and verified by reporting accuracy 510. Training can continue until a desirable accuracy is reported, as seen by decision box 511.

Figure 14:
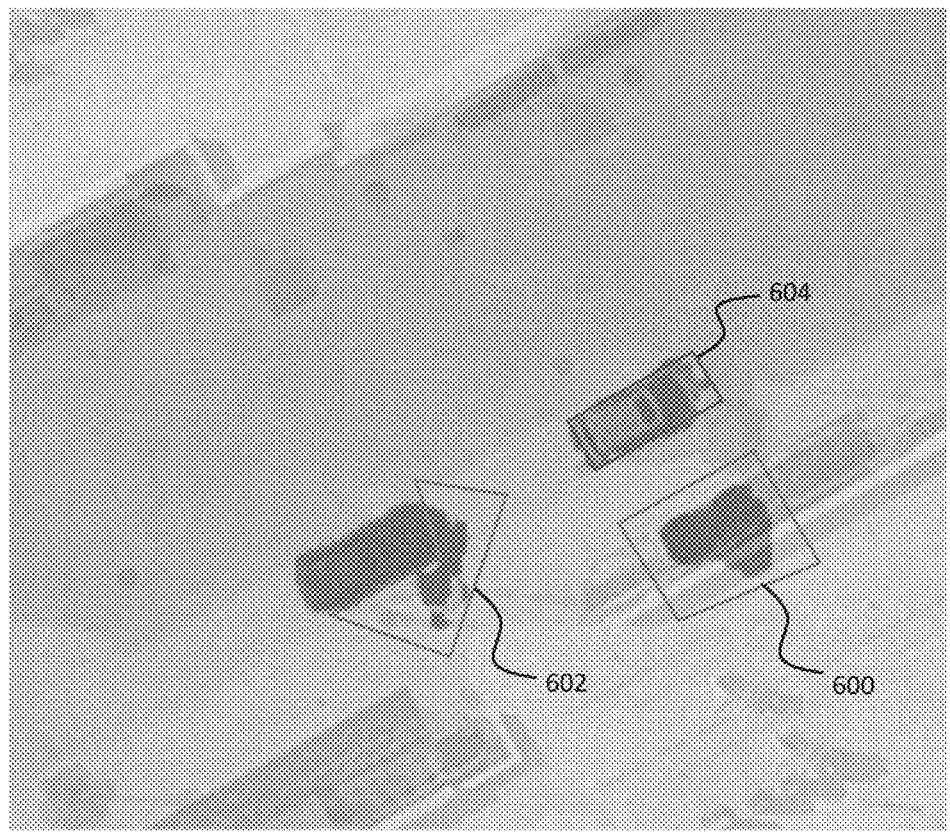
FIG. 14 shows areas erroneously identified as vehicles during training.

In FIG. 14, for example, the FCN detected an object 600 that is not a vehicle and some pavement 602 as a vehicle. During training, these errors are noted, and the weights of the FCN are updated. Training continues until the FCN avoids such errors FIG. 14 shows a vehicle 604 that is correctly detected by the FCN.

Figure 15:
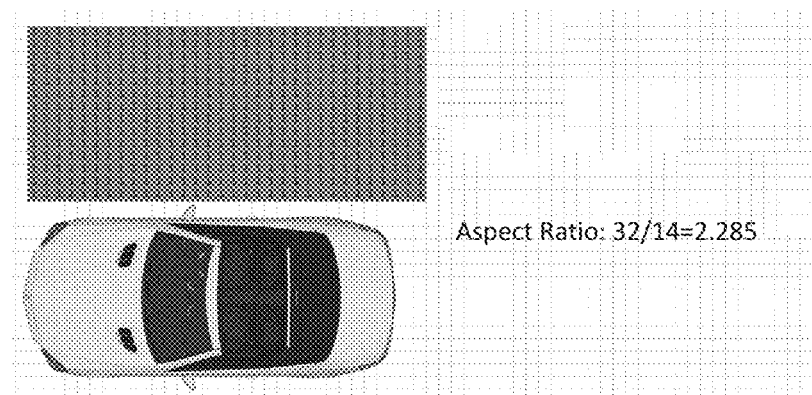
FIG. 15-18 illustrate examples of the number of pixels a car can occupy at different parking angles, according to an embodiment of the invention.
Figure 16:
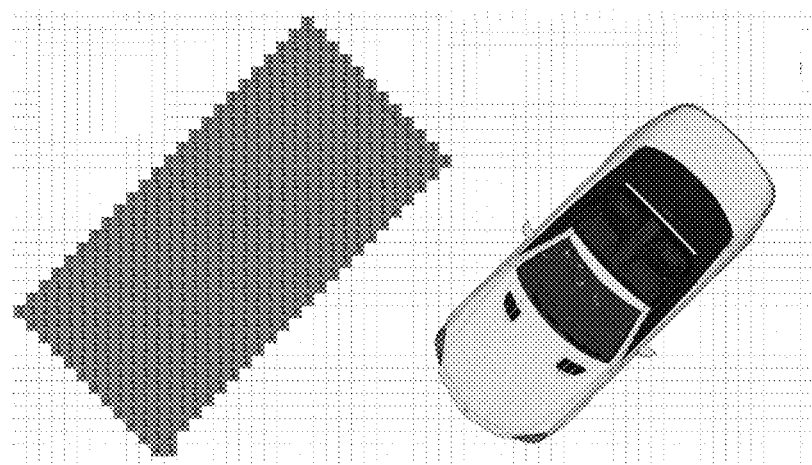
Figure 17:
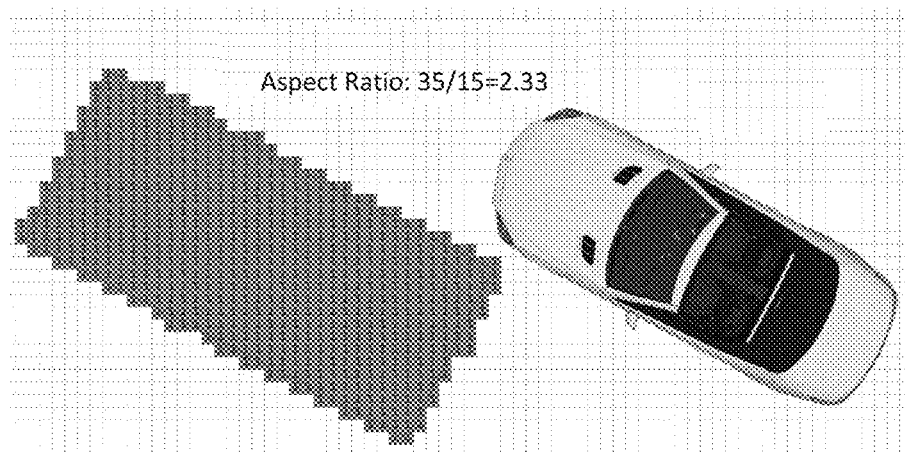
Figure 18:
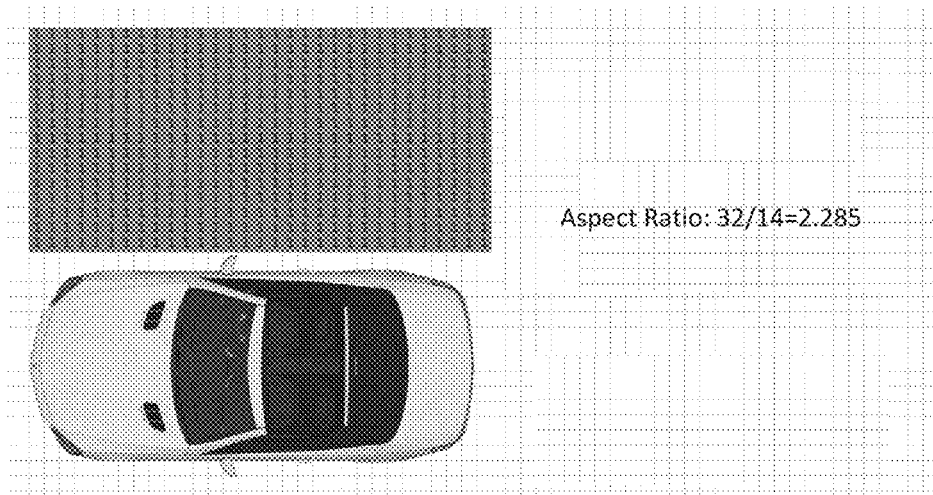

After the FCN is trained to accurately segment images, the vehicles in aerial images can be identified 512 using the FCN. An additional method to verify accuracy of the vehicle identification by the FCN is to count pixels in the vehicle segments. Each vehicle can cover a number of pixels, the number depending on the resolution at which the image is initially captured. In one example, images with a pixel scale of about 15 cm can be analyzed. The angle at which a vehicle is parked can also affect the number of pixels the vehicle covers. FIGS. 15-18 illustrate examples of the number of pixels a vehicle can occupy at different parking angles. At a zero angle or 90 degree angle, as illustrated in FIGS. 15 and 18, the pixels number 448; at a 45 degree angle as illustrated in FIG. 16, the pixels number 542; and at a 30 or 60 degree angle, as illustrated in FIG. 17, the pixels number 594. When a vehicle boundary is determined, pixels numbering between 300 and 600 within the boundary can be an indicator of a correct vehicle identification. For trucks or other relatively large vehicles, the number of pixels can go up to 750 or more.

For each pixel in the image segment representing a vehicle, the RGB and HSV values are extracted. Then the average RGB and HSV values for vehicles is calculated, and this information is used for change detection, as explained below.

Next, metadata can be assigned 518. Each identified vehicle is tagged with a specific set of metadata within each tile deck to calibrate between temporal batches and facilitate detection of vehicle change. Metadata can include, but not be limited to, number of pixels occupied by a vehicle, average RGB and HSV values for the pixels containing a portion of a vehicle, vehicle orientation, geotag information, longitude, latitude, and time and date information for the images.

Figure 19:
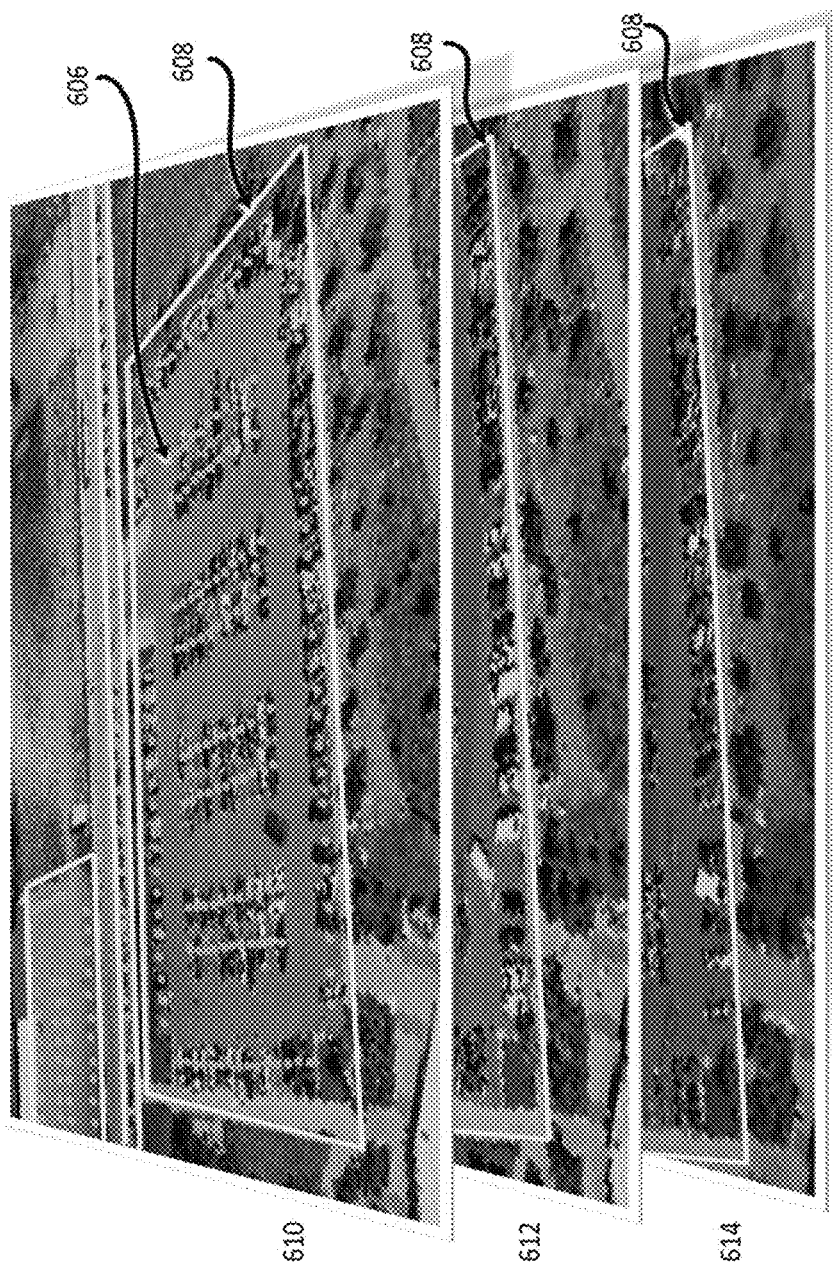
FIG. 19 shows images from three temporal batches collected at different times with centroids and polygons overlaid, according to an embodiment of the invention.

Centroids and polygons can also be used to verify the identification of vehicles in parking spots. Given that the centroids and polygons are georeferenced, they can be located with good accuracy (e.g., within 0.3 meters) on the temporal batches of images. After overlaying these different temporal batches of images with centroids and polygons, spatial information can be extracted from each temporal batch. FIG. 19 shows three temporal batches collected at different times with centroids 606 and polygons 608 overlaid. First batch 610 was collected at 9 AM, second batch 612 was collected at 10 AM, and third batch 614 was collected at 11 AM.

Figure 20:
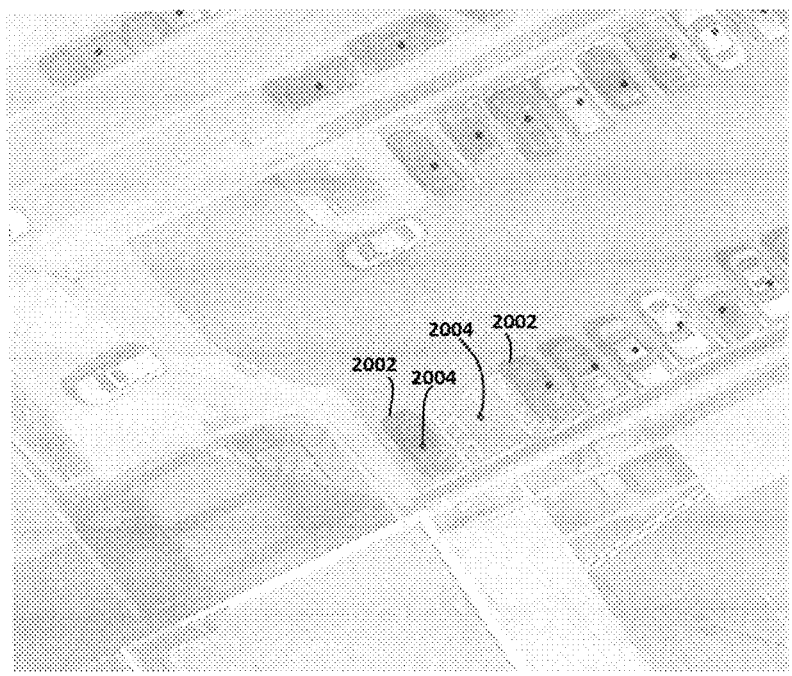
FIG. 20 shows an image with shaded boxes representing vehicles, and with centroids in parking spots, according to an embodiment of the invention.

A labeled area with a point on the labeled area is an indication of a vehicle. Considering FIG. 20, the shaded polygons 2002 represent vehicles, as determined by the FCN. The dots are the centroids 2004 for each parking spot. If there is a vehicle in a parking spot, then the parking spot has both a shaded polygon 2002 and a centroid 2004. Although recognized by the FCN, vehicles not associated with a centroid are determined not to be in a parking spot, which is normally the case for moving vehicles. Accordingly, this method beneficially avoids counting cars that are moving and not parked.

After vehicles are identified in given temporal batches of images, change can be detected 520 between different temporal batches of images, to determine parking duration (i.e., how long a vehicle is in a specific parking space within a given time period), as well as to determine the turnover rates (i.e., the frequency of different vehicles occupying the specific parking space over a given period of time). The vehicle segments with the same geotag can be compared 522. To compare, a deep-learning image matching module can be run 524 to determine if the identified vehicle in any two temporally different but geographically corresponding images has changed. In a certain percentage of images, change can be detected manually 525, which can also be used to train the image matching module when such training is desirable. Manual training can be desirable, for example, when surveying a new geographical area, using a new or different lens or imaging system, or using a new aerial vehicle flight path, etc. Template matching (not shown) can also be used.

The segments can also be compared, and/or the image matching results can be verified, using several criteria. Color values can be compared 526. According to another check, the identified pixels containing vehicle portions in the two images can be converted to the HSI color space from original RGB values. In the HSI space, H (hue) and S (saturation) are indications of color, and I (intensity) represents the pixel intensities, which change throughout the day due to changing sun illumination levels. Taking into consideration the changing I values, the average H and average S values of the pixels in the region identified as a vehicle in two temporally different images can be calculated. The average H and S values remaining unchanged between the two temporally different images indicates that the vehicle remains unchanged. The average H and S values between the two temporally different images being different indicates the vehicle is changed. A threshold level of difference in the H and S values can be established to determine whether the difference indicates a change in the vehicle. Alternatively, a weight or level of confidence in determining that a vehicle changed has occurred can be assigned based on the level of difference in average H and S values.

The center of mass of the vehicles identified in the two images can be compared 528. A threshold amount of center of mass displacement can be predetermined, such that any displacement greater than the threshold amount can indicate vehicle change. Alternatively, a weight or confidence level that a center of mass displacement indicates a vehicle change can be assigned in correlation to the amount of center of mass displacement. In some embodiments, even if the centers of mass have only slightly changed (e.g., 0.5 meters displacement, or less), then the vehicles can be determined to be different.

According to another check, the general orientation of the vehicles can be extracted 530. A center line representing the orientation can be used to verify if the vehicles have changed or not. The centerline can be defined by the slope m of the center line and the y-intercept b, based on statistical line fitting according to the equation m,b=polyfit(x, y, 1)). These two values m and b are the same for two vehicles in the same location in two consecutive images.

Change is determined if differences between two compared images of geographically similar, temporally different locations meet predetermined thresholds. For example, based on a difference in total pixels for an identified vehicle, a difference in averaged RGB pixel values, and a change in the centralized pixel location (x, y), a determination is made regarding a status of an vehicle in the designated location—for example, whether the vehicle is the same, the vehicle is different, or the vehicle is absent. In one instance, the threshold total pixel change is 10%, the threshold averaged RGB pixel value change is 10%, and the centralized pixel location change is 50 centimeters. An example is shown in Tables 1 and 2.

TABLE 1

Image information in Temporal Image 1 at 9:00 am

| Labeled Car's ID | Image Pixel Coordinates | | | | Total pixels for the labeled car | Averaged RGB Values for Total Pixels | centralized pixel | |
|---|---|---|---|---|---|---|---|---|
| | Top left side X Location | Top left side Y Location | Bottom Right side X Location | Bottom Right side Y Location | | | X | Y |
| 2 | 0 | 724 | 25 | 756 | 540 | 130, 127, 128 | 13 | 740 |
| 3 | 0 | 2052 | 16 | 2071 | 480 | 110, 116, 121 | 8 | 2062 |
| 6 | 0 | 3110 | 57 | 3156 | 523 | 96, 87, 92 | 29 | 3133 |
| 7 | 0 | 3418 | 18 | 3435 | 562 | 164, 158, 170 | 9 | 3427 |

TABLE 2

Image information in Temporal Image 2 at 10:00 am

| Labeled Car's ID | Image Pixel Coordinates | | | | Total pixels for the labeled car | Averaged RGB Values for Total Pixels | centralized pixel | | |
|---|---|---|---|---|---|---|---|---|---|
| | Top left side X Location | Top left side Y Location | Bottom Right side X Location | Bottom Right side Y Location | | | X | Y | |
| 2 | 51 | 726 | 76 | 3173 | 540 | 130, 127, 128 | 13 | 740 | Same Car |
| 3 | | | | | | | | | No Car |
| 6 | 121 | 3115 | 178 | 3161 | 523 | 163, 160, 171 | 31 | 3132 | New car |
| 7 | 33 | 3418 | 51 | 3435 | 562 | 164, 158, 170 | 9 | 3427 | Same Car |

In an alternative change detection process applicable to vehicle parking, centroids can be used and the pixels within a predetermined radius surrounding the centroids can be analyzed. For each vehicle, the information such as average RGB and HSV and total number of pixels in the vehicle boundary can be collected and assigned to the centroid in the vehicle boundaries A difference in color index of a vehicle can be distinguished from the color index of background asphalt, and other methods such as boundary detection and image labeling can help identify the entire vehicle more accurately.

Figure 21:
FIGS. 21-22 show images of the same parking spots collected at 9:00 AM and 10:00 AM, according to an embodiment of the invention.
Figure 22:
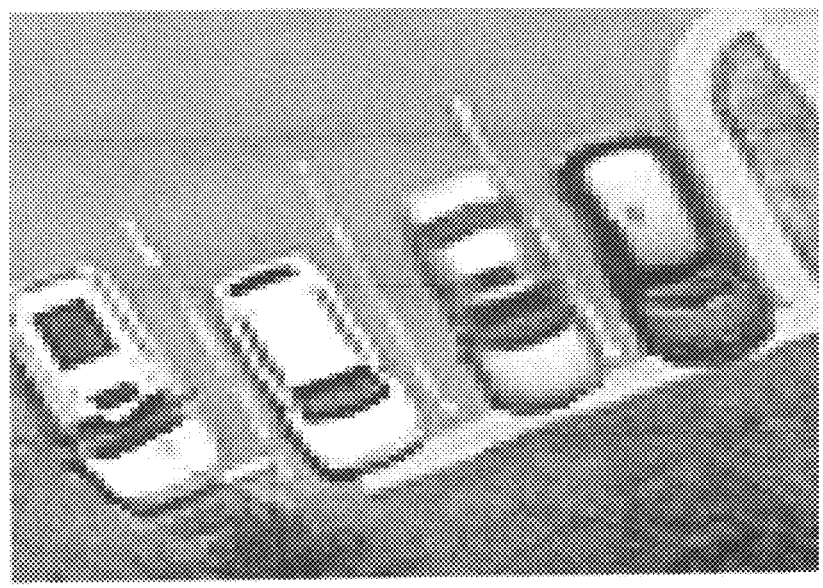
Figure 23:
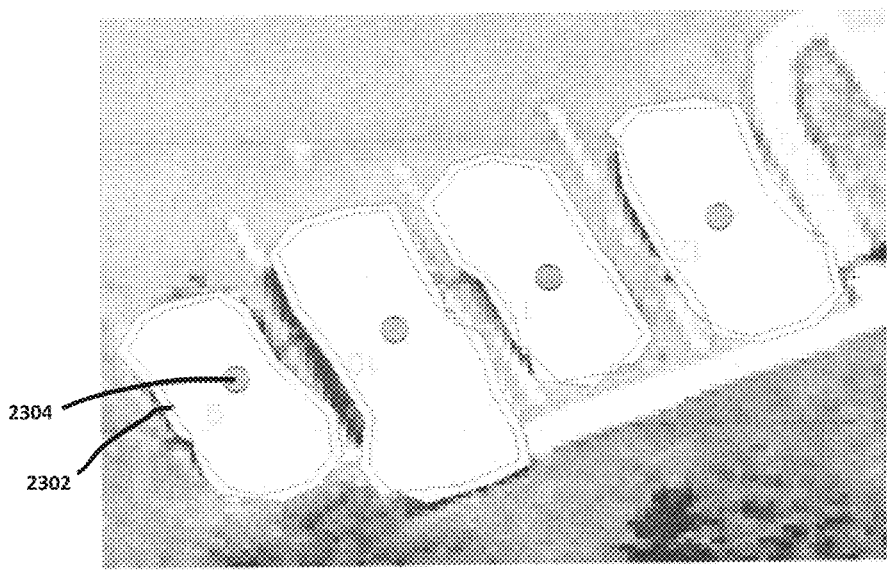
FIG. 23 shows vehicle boundaries 2302 and parking spot centroids 2304 for the vehicles and parking spots imaged in FIG. 22.

FIGS. 21 and 22 show images of the same parking spots collected at 9:00 AM and 10:00 AM, respectively. FIG. 23 shows vehicle boundaries 2302 and parking spot centroids 2304 for the vehicles and parking spots imaged in FIG. 22. Pixel information within each polygon 2302, 2304 can be extracted. The RGB or HSV value of each pixel can be extracted, and the total number of pixels in each polygon can be counted. For each temporal batch, the information can be associated with the common centroid, and the information for each image can be compared to determine whether a vehicle in each respective spot between each image is different.

The change detection process can be repeated if accuracy is not at a desirable level, as seen by decision box 534. Otherwise, results can be compiled and made available for use, such as to run analytics 536. Turnover rate, average occupancy time per vehicle, turnover index, benchmark turnover index, and parking occupancy efficiency, for example, may be calculated based on the compiled results. The parking results can be combined with other layers of information, such as, but not limited to, census-sourced population data, employee commute times, commercial and residential development plans, land uses, time-related parking restrictions, parking fare data, etc. End-users can mine the data and analytics to better understand the built environment and its relationship with how people travel, where people travel, where people park, and how long people stay. For example, the analytics can equip end-users to better understand patterns in areas based on parking dwell time/duration analysis (how long a vehicle is present), and to visualize the patterns with heat maps (high use spaces being "hotter"). Time-related parking restriction and parking fare data can be used in conjunction with dwell time analysis to determine parking violation rates and subsequent municipal parking revenue losses. The land use data can be combined with parking occupancy rates and demand heatmaps and used by a customer to determine potential site improvements, parking reconfigurations, parking fee and enforcement modifications, or even highest and best use of the subject site.

Datasets that can be incorporated can include, but are not limited to:

Assessed and taxable value of parcel;
Parcel ownership information;
Color-coded publicly or privately owned parcel information;
Parking fare data;
Method of parking payment (free, coin-operated meters, smart meters);
Time-limit information (no limit, or X hour parking);
Public transportation information including closest Bus/BRT/LRT/HRT stops;
"Walk Score" integration;
"Bike Score" integration;
Modal split (Driving Alone);
Impermeable coverage and stormwater analysis;
Zoning; and
Future Land Use.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Many of the methods described herein, or aspects of these methods, can be implemented using a variety of computing devices and/or computer readable program instructions. Particular steps of these methods or aspects of these methods can be implemented by a single computing device or system or by a single group or system of computer readable program instructions, or implemented by collaboration of multiple computing devices or systems or by groups or systems of computer readable program instructions. For example, the imaging system 12 of the aerial vehicle 10 can be in communication with a remote computer, which can provide processing capability for the imaging system during image collection, as well as further processing capability after completion of image collection. Likewise, continuing with this example, computer readable program instructions to implement "during image collection" steps described herein, can be implemented wholly or in part on the processor 26 of the imaging system 12 located on the aerial vehicle 10, and/or wholly or in part on a processor of a remote computing device.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that some block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A vehicle parking data collection system comprising:
    at least one computing system including at least one processor and at least one memory, the at last one computing system configured to:
        produce a tiled, orthorectified orthomosaic of images corresponding to a parking area from a plurality of overlapping images of the parking area;
        identify a vehicle in a parking spot of the parking area shown in one or more of the images; and
        detect a vehicle change in the parking spot of the parking area in the images collected at different times.

2. The vehicle parking data collection system of claim 1, wherein the at least one computing system is further configured to condition the overlapping images of the parking area for at least one of image preprocessing, vehicle identification, and change detection.

3. The vehicle parking data collection system of claim 2, wherein the at least one computing system is further configured to determine colorimetrics after the overlapping images are collected.

4. The vehicle parking data collection system of claim 2, wherein the at least one computing system is further configured to format transcode.

5. The vehicle parking data collection system of claim 1, wherein the at least one computing system is further configured to mask non-parking areas.

6. The vehicle parking data collection system of claim 1, wherein the at least one computing system is further configured to put polygons around parking areas and to put centroids in parking spots.

7. The vehicle parking data collection system of claim 1, further comprising an aerial vehicle including an imaging system configured to collect the plurality of overlapping images of the parking area.

8. The vehicle parking data collection system of claim 7, wherein the at least one computing system is further configured to calibrate the imaging system and a lens of the imaging system.

9. The vehicle parking data collection system of claim 7, wherein the at least one computing system is configured to equalize colorimetrics during image collection of temporally different images of the same parking area.

10. The vehicle parking data collection system of claim 7, wherein the imaging system is configured to filter light during image collection.

11. The vehicle parking data collection system of claim 7, wherein the imaging system is configured to determine orientation relative to a projected coordinate system.

12. The vehicle parking data collection system of claim 1, wherein the at least one computing system is further configured to stitch together the overlapping images, orthorectify the stitched images, and orthomosaic tile the orthorectified stitched images.

13. The vehicle parking data collection system of claim 1, wherein the vehicle identification system includes a neural network trained to identify vehicles in the images by segmenting pixels of an image containing a vehicle portion into segments representing a single vehicle.

14. The vehicle parking data collection system of claim 13, wherein the at least one computing system is further configured to verify vehicle identification by the neural network based on a number of pixels in a segment representing a vehicle.

15. The vehicle parking data collection system of claim 1, wherein the at least one computing system is further configured to compare segments from temporally different images of the same parking spot.

16. The vehicle parking data collection system of claim 15, wherein comparing segments includes comparing at least one of pixel colors, segment centers, and vehicle orientation.

17. A method of collecting vehicle parking data comprising:
preprocessing images of a parking area to produce a tiled, orthorectified orthomosaic of the images;
identifying a vehicle in a parking spot of the parking area shown in one or more of the images; and
detecting a vehicle change in the parking spot of the parking area in the images collected at different times.

18. The method of collecting vehicle parking data of claim 17, further comprising conditioning the images for at least one of image preprocessing, vehicle identification, and change detection.

19. The method of collecting vehicle parking data of claim 18, wherein conditioning the images includes determining ex situ colorimetrics, determining ex situ colorimetrics comprising taking a series of color readings of the images, producing an average reading, applying the average reading to the images, applying readings taken from a spectrally neutral WBC recorded under incident shadow during collection of the images to a luminance node restricted to lowest ends of a waveform in each image, and removing a color temperature dissonance cast by shadows onto vehicles at different times of day.

20. The method of collecting vehicle parking data of claim 19, wherein determining ex situ colorimetrics further comprises verifying tint balance by using the readings of the spectrally neutral WBC to measure a green and a magenta tint balance in order to normalize an x and y axis of a color white point scale.

21. The method of collecting vehicle parking data of claim 19, wherein determining ex situ colorimetrics further comprises using an image of a standardized color calibration chart recorded during collection of the images corresponding to the parking area to calibrate each color channel, and to determine an accurate representation of color.

22. The method of collecting vehicle parking data of claim 19, wherein determining ex situ colorimetrics further comprises reducing chromatic noise to reduce erratic pixel coloration inherent in an on-board image processor.

23. The method of collecting vehicle parking data of claim 18, wherein conditioning the images includes formatting transcode.

24. The method of collecting vehicle parking data of claim 17, further comprising masking non-parking areas.

25. The method of collecting vehicle parking data of claim 17, further comprising enhancing the images to place polygons around parking areas and centroids in parking spots.

26. The method of collecting vehicle parking data of claim 17, further comprising an aerial vehicle including an imaging system collecting images of the parking area.

27. The method of collecting vehicle parking data of claim 26, wherein the aerial vehicle collects images of the parking area at different times to produce different temporal batches of images.

28. The method of collecting vehicle parking data of claim 26, further comprising initializing the imaging system and a lens of the imaging system.

29. The method of collecting vehicle parking data of claim 28, wherein initializing the imaging system and the lens of the imaging system further comprises determining a geometry of the lens.

30. The method of collecting vehicle parking data of claim 28, wherein initializing the imaging system and the lens of the imaging system further comprises building a tonal range profile.

31. The method of collecting vehicle parking data of claim 30, wherein building the tonal range profile further comprises taking multiple images of calibration charts under a standardized and consistent illuminate, and determining characteristics of the imaging system using basal imaging system settings.

32. The method of collecting vehicle parking data of claim 30, wherein building the tonal range profile includes taking multiple images of the same chart using a different ISO setting for each of the multiple images, and using every available ISO setting available within the imaging system.

33. The method of collecting vehicle parking data of claim 28, wherein initializing the imaging system and the lens of the imaging system further comprises adjusting system color tuning.

34. The method of collecting vehicle parking data of claim 26, wherein the imaging system equalizes colorimetrics during image collection of temporally different images of the same parking area.

35. The method of collecting vehicle parking data of claim 34, wherein equalizing colorimetrics includes balancing color temperature.

36. The method of collecting vehicle parking data of claim 35, wherein balancing color temperature includes capturing a first image of a color temperature balance calibration chart in direct sunlight and capturing a second image of the balance calibration chart in shadow, and adjusting color temperature in the images corresponding to a parking area based on a comparison with the first and second images.

37. The method of collecting vehicle parking data of claim 36, wherein balancing color temperature occurs immediately before and immediately after collecting images corresponding to a parking area.

38. The method of collecting vehicle parking data of claim 34, wherein equalizing colorimetrics includes determining black balance.

39. The method of collecting vehicle parking data of claim 38, wherein determining a black balance comprises, after a color temperature reading is recorded and imprinted onto an image processor, and after the imaging system is at operating temperature in an imaging environment, minimizing an iris of the imaging system, covering a lens of the imaging system, reducing an exposure index to a desired setting in order to achieve an absolute minimum exposure value, using a resulting analog to digital converter signal as a reference for true black, and optimizing a signal to noise ratio compensation through a low noise amplifier.

40. The method of collecting vehicle parking data of claim 34, wherein equalizing colorimetrics comprises recording a white and tint balance reference.

41. The method of claim 40, wherein recording the white and tint balance reference comprises capturing a first image of a spectrally neutral white balance card in direct sunlight and capturing a second image of the spectrally neutral white balance chart in shadow, and determining tint settings based on the first and second images.

42. The method of collecting vehicle parking data of claim 34, wherein equalizing colorimetrics comprises determining a color calibration reference.

43. The method of collecting vehicle parking data of claim 42, wherein determining a color calibration reference comprises recording an image of a certified color calibration chart while collecting the images corresponding to the parking area.

44. The method of collecting vehicle parking data of claim 26, wherein the imaging system filters light during image collection.

45. The method of collecting vehicle parking data of claim 26, wherein the imaging system determines orientation relative to a projected coordinate system.

46. The method of collecting vehicle parking data of claim 17, wherein preprocessing images comprises stitching together the overlapping images, orthorectifying the stitched images, and orthomosaic tiling the orthorectified stitched images.

47. The method of collecting vehicle parking data of claim 17, wherein identifying vehicles comprises a neural network identifying vehicles in the images by segmenting pixels of an image containing a vehicle portion into segments representing a single vehicle.

48. The method of collecting vehicle parking data of claim 17, wherein identifying vehicles comprises verifying vehicle identification by a neural network based on a number of pixels in a segment representing a vehicle.

49. The method of collecting vehicle parking data of claim 17, wherein detecting vehicle change includes comparing segments from temporally different images of the same parking spot.

50. The method of collecting vehicle parking data of claim 40, wherein comparing segments includes comparing at least one selected from a group consisting of number of pixels for each vehicle, average pixel colors, segment centers, and vehicle orientation.

* * * * *